(12) United States Patent
Erdelyi et al.

(10) Patent No.: US 11,587,376 B2
(45) Date of Patent: Feb. 21, 2023

(54) SYSTEMS AND METHODS FOR DELIVERING VEHICLE PARAMETERS TO A REMOTE DEVICE VIA VEHICLE MODULE IDENTITIES

(71) Applicant: CalAmp Corp., Irvine, CA (US)

(72) Inventors: Christopher Erdelyi, Irvine, CA (US); David Huang, Irvine, CA (US); Daniel Anthony Verdusco, Irvine, CA (US); Stephen Hall, Santa Ysabel, CA (US)

(73) Assignee: CalAmpCorp., Irvine, CA (US)

( * ) Notice: Subject to any disclaimer, the term of this patent is extended or adjusted under 35 U.S.C. 154(b) by 347 days.

(21) Appl. No.: 16/803,778

(22) Filed: Feb. 27, 2020

(65) Prior Publication Data

US 2021/0272392 A1    Sep. 2, 2021

(51) Int. Cl.
G07C 5/08   (2006.01)
H04L 12/40  (2006.01)
G07C 5/00   (2006.01)

(52) U.S. Cl.
CPC ............. *G07C 5/085* (2013.01); *G07C 5/008* (2013.01); *G07C 5/0808* (2013.01); *H04L 12/40013* (2013.01); *H04L 2012/40215* (2013.01); *H04L 2012/40273* (2013.01)

(58) Field of Classification Search
CPC ...... G07C 5/085; G07C 5/008; G07C 5/0808; G07C 2205/02; G07C 5/0841; H04L 12/40013; H04L 2012/40215; H04L 2012/40273
See application file for complete search history.

(56) References Cited

U.S. PATENT DOCUMENTS

| 8,903,593 | B1 | 12/2014 | Addepalli et al. | |
|---|---|---|---|---|
| 2010/0070107 | A1 | 3/2010 | Berkobin et al. | |
| 2015/0052226 | A1* | 2/2015 | Rude ............... | G07C 5/008 |
| | | | | 709/219 |
| 2016/0098369 | A1 | 4/2016 | Berkobin | |
| 2019/0108010 | A1 | 4/2019 | Tillman et al. | |
| 2019/0279447 | A1 | 9/2019 | Ricci | |
| 2020/0015048 | A1* | 1/2020 | Mendes ............ | H04W 4/38 |

FOREIGN PATENT DOCUMENTS

| WO | 2018197920 A1 | 11/2018 |
|---|---|---|
| WO | 2019043446 A1 | 3/2019 |

OTHER PUBLICATIONS

International Search Report and Written Opinion for International Application No. PCT/US2020/020185, Search completed Apr. 29, 2020, dated Jun. 4, 2020, 8 pgs.

(Continued)

*Primary Examiner* — Michael V Kerrigan
(74) *Attorney, Agent, or Firm* — Barnes & Thornburg LLP

(57) ABSTRACT

Embodiments of the invention include a vehicle telematics system that receives different types of identification information from different vehicle modules on the vehicle bus of a vehicle, identifies a vehicle platform based on the identification information by matching the identification information with information stored in a database that has been reverse engineered for a vehicle with a same and/or similar platform and identifies a set of communication data associated with the vehicle platform for communicating with the at least one vehicle module.

18 Claims, 18 Drawing Sheets

OTHER PUBLICATIONS

International Search Report for International Application No. PCT/US2020/020186; Search completed May 2, 2020, dated Jun. 4, 2020, 13 pgs.
"E/E Diagnostic Test Modes", SAE International Surface Vehicle Recommended Practice, SAE Standard J1979, Issued Dec. 1, 1991, Revised Aug. 11, 2014.
"OBD II Scan Tool", SAE International Surface Vehicle Recommended Practice, SAE Standard J1978, Issued Mar. 1, 1992, Revised Apr. 30, 2002.
Avatefipour, "Physical-Fingerprinting of Electronic Control Unit (ECU) Based on Machine Learning Algorithm for In-Vehicle Network Communication Protocol "CAN-BUS"", Thesis submitted 2017, University of Michigan-Dearborn, 71 pgs.
Huybrechts et al., "Automatic Reverse Engineering of CAN Bus Data Using Machine Learning Techniques", Advances on P2P, Parallel, Grid, Cloud and Internet Computing, Nov. 3, 2017, vol. 13, pp. 751-776, doi: https://doi.org/10.1007/978-3-319-69835-9_71.

* cited by examiner

| | A | B | C | D | E |
|---|---|---|---|---|---|
| 1 | Makes | Tx Msg | | BytePOS | ByteLength |
| 2 | VW/AUDI | 0x0022F19E | ASAM/ODX FILE ID | 3 | 25 |
| 3 | VW/AUDI | 0x0022F1A2 | ASAM/ODX FILE VERSION | 3 | 6 |
| 4 | Alfa_Romeo | 0x0022F1A0 | HW/SW | 31 | 23 |
| 5 | Alfa_Romeo | 0x0022F1A5 | ISO CODE | 3 | all |
| 6 | LR/Jaguar | 0x0022F111 | Core Assembly | 3 | all |
| 7 | LR/Jaguar | 0x0022F113 | Delivery Assembly | 3 | all |
| 8 | LR/Jaguar | 0x0022F108 | Network Signal Calibratio | 3 | all |
| 9 | LR/Jaguar | 0x0022F188 | SW | 3 | all |
| 10 | LR/Jaguar | 0x0022F18C | Serial | 3 | all |
| 11 | Benz | 0x0022F100 | Diagnostic ID | 3 | 3 |
| 12 | Benz | 0x0022F18C | Serial | 3 | all |
| 13 | Benz | 0x0022F154 | Supplier ID | 3 | all |
| 14 | Toyota | 0x00000904 | Calibration ID 1 | 3 | 16 |
| 15 | Toyota | 0x00000904 | Calibration ID 2 | 19 | 16 |
| 16 | Toyota | 0x00000904 | Calibration ID 3 | 35 | 16 |
| 17 | Ford | 0x0022F111 | Core Assembly Number | 3 | 24 |
| 18 | Ford | 0x0022F188 | Software Number | 3 | 24 |
| 19 | Ford | 0x0022F113 | Delivery Assembly Numb | 3 | 24 |
| 20 | Subaru | 0x0022F189 | Software Version | 3 | 10 |
| 21 | Subaru | 0x0022F18E | Part No | 3 | 20 |
| 22 | Nissan | 0x00002183 | System Identification | 2 | 24 |
| 23 | Nissan | 0x0022F188 | ECU Part No | 3 | 10 |
| 24 | Nissan | 0x0022F194 | Software Number | 3 | 7 |
| 25 | Nissan | 0x0022F1A0 | Diagnostic Ver | 3 | 1 |
| 26 | FCA | 0x00001A87 | Variant Number | 4 | 1 |
| 27 | FCA | 0x00001A87 | Version Number | 5 | 1 |
| 28 | FCA | 0x0022F100 | Variant Number | 4 | 1 |
| 29 | FCA | 0x0022F100 | Version Number | 5 | 1 |

FIG. 7

| | A | B | C | D | E | F |
|---|---|---|---|---|---|---|
| 1 | Makes | Module Name | BusTypeName | BusSpeed | Req CAN ID | Resp CAN ID |
| 2 | VW/AUDI | Steering assist | CAN 6-14 | 500000 | 0x0000070C | 0x00000776 |
| 3 | VW/AUDI | BCM | CAN 6-14 | 500000 | 0x0000070E | 0x00000778 |
| 4 | VW/AUDI | Engine | CAN 6-14 | 500000 | 0x000007E0 | 0x000007E8 |
| 5 | VW/AUDI | TCM | CAN 6-14 | 500000 | 0x000007E1 | 0x000007E9 |
| 6 | VW/AUDI | Gateway | CAN 6-14 | 500000 | 0x00000710 | 0x0000077A |
| 7 | VW/AUDI | | CAN 6-14 | 500000 | 0x00000713 | 0x0000077D |
| 8 | VW/AUDI | Instrument | CAN 6-14 | 500000 | 0x00000714 | 0x0000077E |
| 9 | VW/AUDI | Airbag | CAN 6-14 | 500000 | 0x00000715 | 0x0000077F |
| 10 | VW/AUDI | | CAN 6-14 | 500000 | 0x00000752 | 0x0000078C |
| 11 | VW/AUDI | | CAN 6-14 | 500000 | 0x00000796 | 0x00000797 |
| 12 | VW/AUDI | Gear selector | CAN 6-14 | 500000 | 0x00000753 | 0x0000078D |
| 13 | Alfa Romeo | Engine | CAN 6-14 | 500000 | 0x18DA10F1 | 0x18DAF110 |
| 14 | Alfa Romeo | Instrument | CAN 6-14 | 500000 | 0x18DA60F1 | 0x18DAF160 |
| 15 | Alfa Romeo | BCM | CAN 6-14 | 500000 | 0x18DA40F1 | 0x18DAF140 |
| 16 | Alfa Romeo | Instrument | CAN 1-9 | 50000 | 0x18DA60F1 | 0x18DAF160 |
| 17 | Alfa Romeo | BCM | CAN 1-9 | 50000 | 0x18DA40F1 | 0x18DAF140 |
| 18 | LR/Jaguar | Instrument | CAN 6-14 | 500000 | 0x00000720 | 0x00000728 |
| 19 | LR/Jaguar | TCM | CAN 6-14 | 500000 | 0x000007E1 | 0x000007E9 |
| 20 | LR/Jaguar | Engine | CAN 6-14 | 500000 | 0x000007E0 | 0x000007E8 |
| 21 | LR/Jaguar | BCM | CAN 6-14 | 500000 | 0x00000726 | 0x0000072E |
| 22 | Benz | Instrument | CAN 6-14 | 500000 | 0x00000584 | 0x000004F4 |
| 23 | Benz | Instrument | CAN 6-14 | 500000 | 0x0000060A | 0x00000481 |
| 24 | Benz | Engine | CAN 6-14 | 500000 | 0x000007E0 | 0x000007E8 |
| 25 | Benz | TCM | CAN 6-14 | 500000 | 0x000007E1 | 0x000007E9 |
| 26 | Benz | Fuel Pump | CAN 6-14 | 500000 | 0x000007E3 | 0x000007EB |
| 27 | Benz | ABS | CAN 6-14 | 500000 | 0x00000632 | 0x00000486 |
| 28 | Benz | Instrument | CAN 6-14 | 500000 | 0x00000641 | 0x000005C1 |

FIG. 8

SYSTEMS AND METHODS FOR DELIVERING VEHICLE PARAMETERS TO A REMOTE DEVICE VIA VEHICLE MODULE IDENTITIES

FIELD OF THE INVENTION

The present invention relates to telematics devices with automatic installation and configuration abilities that can determine a vehicle identity and configure a telematics device accordingly to enable communication on different types of vehicles with different vehicle bus communication platforms. In particular, a telematics device can automatically identify a vehicle platform or a vehicle bus "electronic signature", which can be associated with different years, makes and models (YMM) among other identifying features of vehicles based on an analysis of raw vehicle bus data. Many embodiments of the telematics device may utilize machine learning models to train and classify vehicle bus data for different types of vehicles with different YMMs. Many embodiments of the telematics device use a matching technique to obtain vehicle identification data from vehicle devices on the vehicle bus and match that data with data previously stored within a database that provides sets of information for enabling communicating on vehicles with different platforms.

BACKGROUND

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording vehicle information/data related to the operation of the vehicle and providing that information for analysis, whether in real-time or not, such as during a time when the vehicle is being serviced. The vehicle information/data (telematics data) generated by a telematics unit can be used in a variety of applications, such as fleet tracking, shipment tracking, insurance calculations, and in vehicle management and service.

A vehicle bus is a specialized internal communications network that interconnects components inside a vehicle (e.g., automobile, bus, train, industrial or agricultural vehicle, ship, or aircraft). Protocols include Controller Area Network (CAN), Local Interconnect Network (LIN) among various others. Typical electronic vehicle modules or vehicle devices on today's vehicles include the Engine Control Unit (ECU), the Transmission Control Unit (TCU), the Anti-lock Braking System (ABS) and body control modules (BCM), among others. Each module, a node on the vehicle network, controls specific components related to its function and communicates with the other modules as necessary using a particular protocol over the vehicle network.

OBD-II PIDs (On-board diagnostics Parameter IDs) are codes used to request data from a vehicle, which can be used as a diagnostic tool. SAE standard J1979 defines many OBD-II PIDs. Manufacturers may also define additional PIDs specific to their vehicles. The majority of all OBD-II PIDs in use are non-standard. For most modern vehicles, there are many more functions supported on the OBD-II interface than are covered by the standard PIDs, and there is relatively minor overlap between vehicle manufacturers for these non-standard PIDs.

A vehicle identification number (VIN) is the identifying code for a specific vehicle and serves as a vehicle's fingerprint. The vehicle's VIN number may be provided to an outside third party, such as a "VIN lookup" service, in order to obtain identifying information for a vehicle, including a year, make and model, and telematics devices may use this information in order to obtain information regarding a particular vehicle's identity.

SUMMARY OF THE INVENTION

Systems and methods for identifying a vehicle platform and configuring a telematics device for a set of vehicle devices associated with the vehicle platform in accordance with embodiments of the invention are disclosed. In an embodiment, a method for configuring a telematics device for a vehicle includes: receiving, at a remote server system, different types of identification information from several different vehicle modules on the vehicle bus of the vehicle from a telematics device on the vehicle; identifying, at the remote server system, a vehicle platform based on the identification information by matching the identification information with information stored in at least one database that has been reverse engineered for a vehicle with a same platform; identifying, at the remote server system, a set of communication data associated with the vehicle platform for communicating with the at least one vehicle module; providing, at the remote server system, the set of communication data to the vehicle telematics device.

In still a further embodiment, identifying a vehicle platform based on the identification information includes matching the identifying information to vehicle platform information stored in at least one database.

In still a further embodiment, the identification information from at least one vehicle module is at least one of a vehicle device identifier, manufacturer identifier, software identifier, and hardware identifier.

In still a further embodiment, the vehicle bus is a Controller Area Network (CAN) vehicle and the communication data is a set of On-board Diagnostic Parameter IDs (OBD-II PIDs).

In still a further embodiment, the at least one vehicle module includes a several vehicle modules, where the method further includes: communicating with a first vehicle module using a first set of OBD-II PIDs received from the remote server system; and communicating with a second vehicle module using a second different set of OBD-II PIDs received from the remote server system.

In still a further embodiment, the method of claim further includes: providing, at the remote server system, information regarding a year, make, and model (YMM) of the vehicle from the remote server system; and configuring the telematics device based on the YMM information.

In still a further embodiment, the at least one database includes identification information for identifying different vehicle modules for different types of vehicles.

In still a further embodiment, the at least one database includes different sets of configuration data for configuring different vehicle modules on different types of vehicles.

In still a further embodiment, the at least one database includes normalized sets of identification data for different manufacturers of vehicle modules.

In another embodiment, a vehicle telematics device in a vehicle, includes a processor and a memory storing a vehicle telematics application; and a communication interface for communicating with a remote server system and several vehicle modules on a vehicle bus of the vehicle; where the processor of the telematics device, on reading the vehicle telematics application, is directed to: receive identification information from at least one vehicle device on the vehicle bus of the vehicle; provide the identification information to the remote server system; obtain communication data to allow for communication with the at least one vehicle module from the remote server system; communicate with the at least one vehicle module using the communication data.

In still a further embodiment, the remote server system identifies a vehicle platform based on the identification information by matching the identifying information to vehicle platform information stored in at least one database on the remote server system.

In still a further embodiment, the identification information from the at least one vehicle module is at least one of a vehicle device identifier, manufacturer identifier, software identifier, and hardware identifier.

In still a further embodiment, the vehicle bus is a Controller Area Network (CAN) vehicle and the communication data is a set of On-board Diagnostic Parameter IDs (OBD-II PIDs).

In still a further embodiment, the at least one vehicle module includes several vehicle modules, wherein the processor of the telematics device, on reading the vehicle telematics application, is further directed to: communicate with a first vehicle module using a first set of OBD-II PIDs received from the remote server system; and communicate with a second vehicle module using a second set of OBD-II PIDs received from the remote server system.

In still a further embodiment, the processor of the telematics device, on reading the vehicle telematics application, is further directed to: obtain information regarding a year, make, and model, of the vehicle from the remote server system.

In still a further embodiment, the remote server system includes at least one database that includes identification information for identifying different vehicle modules for different types of vehicles.

In still a further embodiment, the remote server system includes at least one database that includes different sets of configuration data for configuring different vehicle modules on different types of vehicles.

In still a further embodiment, the remote server system includes at least one database that includes normalized sets of identification data for different manufacturers of vehicle modules.

In still a further embodiment, the processor of the telematics device, on reading the vehicle telematics application, is further directed to: sending a request according to a first vehicle bus protocol for identification information on the vehicle bus; and—when a response is not received within a time period, sending a request according to a different second vehicle protocol for identification information on the vehicle bus after expiration of the time period.

BRIEF DESCRIPTION OF THE DRAWINGS

FIG. 7 illustrates identifiable data types that can be used for identification of a vehicle and/or vehicle type in accordance with an embodiment of the invention.

FIG. 8 illustrates an example of different vehicle modules that can be available for different types of vehicles in accordance with an embodiment of the invention.

DETAILED DESCRIPTION

Figure 1:
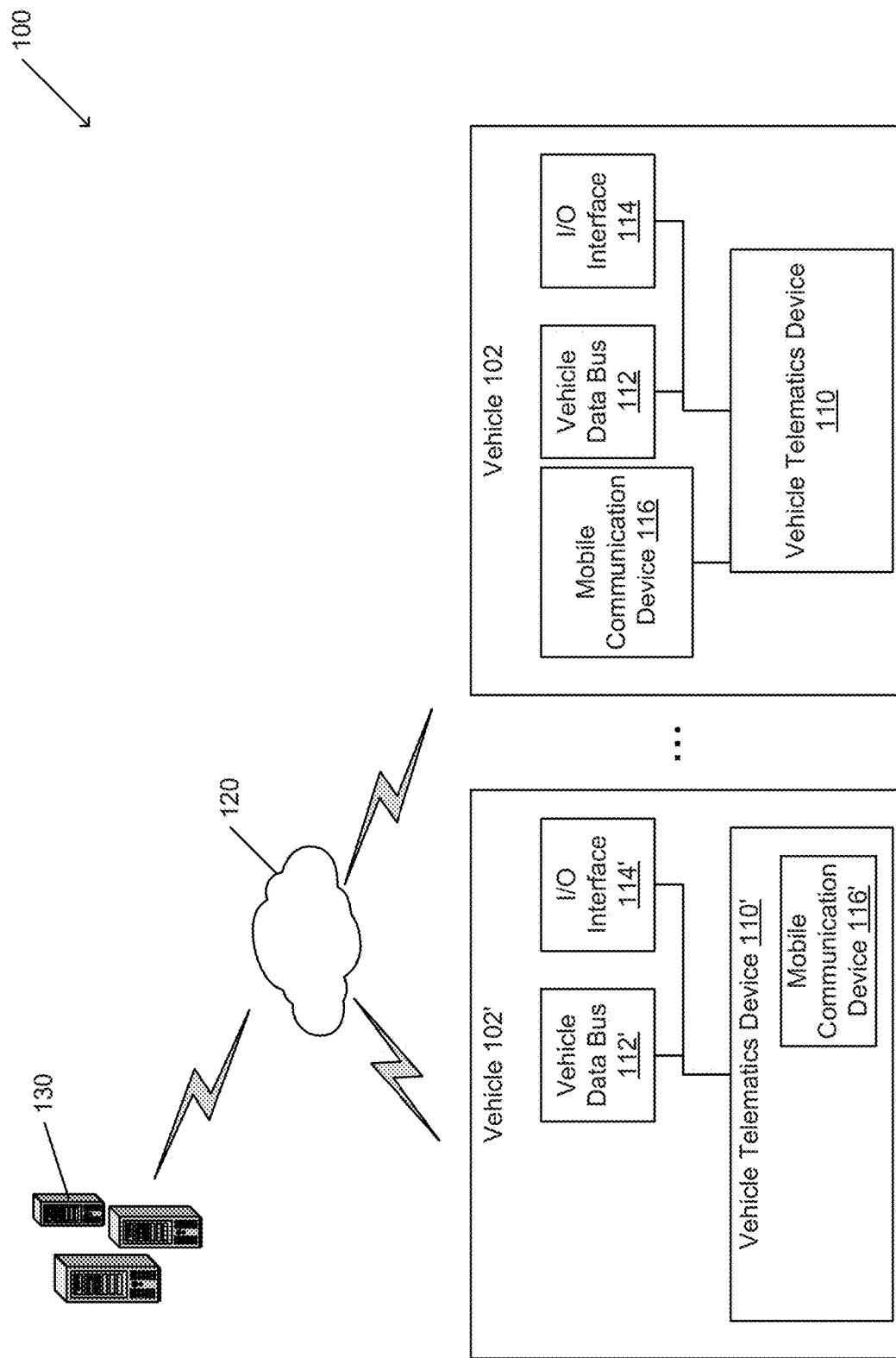
FIG. 1 is a conceptual diagram of a vehicle telematics system in accordance with an embodiment

Turning now to the drawings, systems and methods for configuring telematics devices for identifying a vehicle platform and configuring the telematics device for the set of vehicle devices associated with the vehicle platform in accordance with embodiments of the invention are disclosed. Many current telematics devices rely on using third party "VIN lookup" services in order to obtain vehicle identification information for a particular vehicle, such as the year, make, model (YMM) of the vehicle, in order to configure a telematics device for the particular vehicle platform to enable the telematics device to communicate with the vehicle modules on the vehicle according to the particular communication protocol used by the vehicle. In particular, a set of configuration parameters may be specified for each YMM of a vehicle and many different configuration parameters may exist for many different vehicle types.

However, VIN lookup services are not available in many countries throughout the world. Accordingly, many embodiments provide for systems and methods for identifying a vehicle platform using vehicle data obtained from different vehicle modules and matching that data with data stored in a database that has been reverse engineered for different vehicles with different vehicle platforms.

In particular, in order to determine a YMM of a vehicle, many existing telematics devices can obtain the VIN of the vehicle and, using a third-party VIN lookup service, can obtain the vehicle identification information (e.g., YMM). However, many countries, and in particular in Latin America, do not yet offer VIN lookup services, and thus obtaining identifying information for a vehicle using a VIN number is not available. Furthermore, many VIN lookup services charge a fee for the service, and this would be incurred each time a telematics device needs to be configured (e.g., including obtaining the correct set of OBD-II PIDS for communicating with vehicle modules) during installation within a vehicle.

Furthermore, even within a same YMM of a vehicle, many different vehicle trim levels and configurations may be available for the vehicle, including upgrades and addition of features, and thus a same YMM vehicle can still have a different set of vehicle modules. Thus, applying a configuration based on YMM may still not be sufficient for communicating with different vehicles of a same type given the differences that may exist in the vehicle modules. Likewise, vehicle can be customized and vehicle modules can be added, removed, installed from different manufacturers, have different version numbers, hardware profiles, firmware configurations, among various other differences. Accordingly, in order to provide configuration parameters for a specific set of modules on a vehicle, telematics devices in accordance with many embodiments of the invention are able to determine the set of configuration parameters specific to a particular vehicle based on identifying a platform associated with the vehicle. A platform can be a set of configuration settings for permitting communication with a set of vehicle devices on a particular vehicle. A platform can be shared among vehicles of a same YMM, but can also be different for vehicles with a same YMM, such as those vehicles having different trim configurations, customizations, after market parts, among many other differences. Furthermore, vehicles with different YMM can also be associated with a same platform. For example, vehicles manufactured by a same parent company can have a shared platform, such as Lexus and Toyota which are part of a same parent company (Toyota) and thus can share many vehicle modules.

Accordingly, many embodiments are able to identify a vehicle platform for a particular vehicle based on an analysis of various identification data received from several different vehicle modules on the vehicle. In many embodiments, the platform can be identified by collecting identifying information from one or more vehicle modules on a vehicle, and matching the identifying information with previously reverse engineered platform profile information stored within a database that determines a particular platform and associated set of configuration settings (e.g., PIDs) for the vehicle. In many embodiments, the database includes platform information for many different vehicle modules that have been identified for different vehicles through reverse engineering, and each module can be associated with a set of PIDS for the particular module.

In many embodiments, the collection and storage of platform data is collected using reverse engineering, whereby for each vehicle type of many different vehicle types, bus logs are obtained and analyzed in order to identify a set of PIDs for each vehicle module on the particular vehicle. The platform data can include many different identifiers collected for the particular vehicle, including manufacturer information, software ID information, hardware ID, version number, ODX file number, ISO code, Serial number, Diagnostic ID, Part Number, ECU part number, among many other types of data that can be used for identification of a vehicle module and/or a vehicle type. Each different type of vehicle and vehicle module may provide different types of data, if any, on the vehicle bus and this data can be collected for future identification of the vehicle platform.

Accordingly, a set of platforms can be generated, where each platform specifies a set of configuration settings for a set of vehicle modules for a vehicle of a particular type or having a particular platform. As such, vehicles can be associated with a same platform if the vehicles have the same or similar vehicle modules. The platform database can be used to match identification information obtained from a vehicle bus of an unknown vehicle to match the information with the stored information to determine a platform of the vehicle, whereby the configuration settings (e.g., PIDs) can be provided to the vehicle.

In many embodiments, the platform data can also include various information regarding the particular platform of a vehicle, including a bus type, bus speed, bit offset, and byte length, among various other data fields for communicating on the particular vehicle platform. Accordingly, by using reverse engineering to build a database with configuration and identification information for many different types of vehicles, a telematics device can seamlessly integrate and be configured according to the particular specifications utilized by a particular vehicle.

In many embodiments, machine learning can be used to identify a vehicle platform and to determine a set of configuration settings for the vehicle. In particular, in many embodiments, a machine learning process can be trained using a large collection of pre-labeled training data that includes CAN bus traffic for many different vehicle platforms, including different vehicle makes, models, years, trims, geographic locations, among various other differences associated with different platforms. In many embodiments, a vehicle can be classified using machine learning, by considering a pattern, frequency, and/or content of communication over the vehicle bus (e.g., vehicle CAN bus) as its electronic signature. Accordingly, many embodiments can use the vehicle CAN bus electronic signature and build and train a neural network on a well labeled dataset of different vehicles, including their electronic signatures and vectors, and the machine learning model can be used to identify any new vehicle, including identifying, among other information, a YMM of a vehicle, by classifying it based on the vehicle signatures that the neural network has already seen and been trained upon. In many embodiments, the training data can be a collection of bus statistics for different vehicles, where an electronic signature of a vehicle can be determined based on a frequency of a particular vehicle module device ID (e.g., a Message ID datafield within a CAN bus data traffic) appearing within a pre-set time period within the bus traffic of the particular vehicle platform. In many embodiments, a central server can contain a database of vehicle bus statistics and the machine learning model can be trained on this dataset. Subsequently, a remote device can collect vehicle CAN bus statistics on a particular vehicle and wirelessly report this information to the server, which can use the machine learning model to classify the reported statistics and match the classified result to a vehicle platform. In many embodiments, the vehicle device can perform both the collection of the bus data and the machine learning process on the data. In several embodiments, a telematics device can be connected to a smart phone and utilize the processing capabilities of the smart phone device to perform at least some of the machine learning processing on the vehicle data. Any combination of processing can be performed on any one of the telematics device, a remote server, and/or a smartphone connected to the telematics device through wired or wireless (e.g., Bluetooth, BLE, among others) connections.

In many embodiments, a vehicle platform can be associated with a specific set of ODB-II PIDs within a database on the server for a set of vehicle modules on the particular vehicle, whereby the server can transmit the PID definitions to the telematics device on the vehicle for configuring the device to communicate with the various vehicle modules. In many embodiments, the machine learning model can be executed using any combination of a server, telematics device, and/or smartphone device (e.g., iPhone, Android, among numerous others). Profile matching and machine learning techniques for matching identification information with stored vehicle profiles to configure telematics devices in accordance with embodiments of the invention are described in detail throughout this application.

Vehicle Telematics Systems

Vehicle telematics systems in accordance with embodiments of the invention can communicate with a telematics device installed on a vehicle. A conceptual diagram of a vehicle telematics system in accordance with an embodiment of the invention is shown in FIG. 1.

FIG. 1 is a conceptual diagram of a vehicle telematics system 100 in accordance with an embodiment. Vehicle telematics systems described herein can obtain a variety of identification data for a vehicle to determine device configuration settings, which can include a set of on-board diagnostic Parameter IDs (PIDs), for the vehicle. The vehicle telematics system 100 includes one or more vehicle telematics devices (110, 110', etc.) typically mounted in or on a vehicle (102, 102', etc.).

A vehicle (102, 102', etc.) can be any car, truck, bus, train, airplane, helicopter, drone, motorcycle, bicycle, watercraft, land craft, and/or aircraft, among other vehicles. A vehicle (102, 102', etc.) can be manned, unmanned, motorized, unmotorized, directly operated, remotely operated, artificial intelligence operated, self-driving, self-flying, and/or self-sailing, among other things. A vehicle can be operated by an operator (e.g., driver) and/or operated at least in part by an automated system (e.g., self-driving system, etc.).

Many other configurations of the vehicle 102 are within the scope of the present technology. FIG. 1 illustrates the vehicle 102' including a vehicle telematics device 110' having a mobile communication device 116'. The vehicle telematics device 110' is coupled to a vehicle data bus 112' and an I/O interface 114'. The devices 110', 112', 114', and 116' may function like the devices 110, 112, 114, and 116, but may have different physical configurations.

The vehicle telematics device 110 can be coupled to a connector and/or a wire harness in communication with one or more vehicle data bus 112 of the vehicle 102 to obtain power and exchange signals with one or more vehicle devices or sensors, including one or more electronic control unit (ECU) modules. In certain embodiments, the vehicle telematics device 110 can interface to the vehicle data using wireless communications (e.g., Bluetooth, among others) to communicate with the one more ECUs.

The vehicle telematics device 110 can further be coupled to a wired or wireless input/output (I/O) interface 114 and/or a mobile communications device 116 as appropriate to the requirements of specific applications of the embodiments.

In a variety of embodiments, the vehicle telematics device 110 communicates with the remote server system 130 via the mobile communications device 116 over a network 120. In a variety of embodiments, the network 120 is the Internet. In many embodiments, the network 120 is any wired or wireless network, such as a cellular network, between the vehicle telematics device 110 and/or the remote server system 130. In a number of embodiments, the remote server system 130 is implemented by using a single server system. In several embodiments, the remote server system 130 is implemented by using multiple server systems.

In a variety of embodiments, the vehicle telematics device 110 is installed in a vehicle 102 having the vehicle data bus 112. In several embodiments, the vehicle telematics device 110 is connected to a vehicle diagnostic connector that provides access to the vehicle data bus 112. The vehicle telematics device 110 can obtain data from any of a variety of vehicle devices and modules connected to the vehicle data bus 112 utilizing any of a variety of techniques as appropriate to the requirements of specific applications of embodiments. Vehicle devices can include, but are not limited to, engine sensors, electronic control unit (ECU) devices, alternator sensors, vibration sensors, voltage sensors, oxygen sensors, Global Positioning System (GPS) receivers, ignition devices, weight sensors, wireless network devices, and/or acceleration determination devices. Systems and methods for connecting to a vehicle data bus that can be utilized in accordance with the embodiments are described in SAE J1978, titled "OBD II Scan Tool," first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety. Systems and method for connecting to a vehicle data bus that can be utilized in accordance with embodiments are described in various other SAE publications, including SAE J3005, titled "Permanently or semi-permanently installed diagnostic communication devices", first published by SAE International on Dec. 3, 2014, the disclosure of J3005 is hereby incorporated by reference in its entirety.

In a number of embodiments, the vehicle telematics device is connected directly, either wired or wirelessly, to one or more sensors or vehicle modules within the vehicle 102 and/or does not utilize the vehicle data bus 112.

The vehicle telematics device 110 can include any of a variety of sensors and/or devices, including those described herein with respect to the vehicle data bus and any described in more detail herein, to obtain data regarding the vehicle and its environment. The vehicle telematics device 110 can also communicate with any of a variety of sensors and/or devices by using the I/O interface 114. The I/O interface 114 can be any connection, including wired and wireless connections, as appropriate to the requirements of specific applications of the embodiments.

In several embodiments, the vehicle telematics device 110 is capable of executing scripts to read data and/or perform particular processes. These scripts can be pre-loaded on the device and/or obtained from the remote server system 130, vehicle data bus 112, and/or the I/O interface 114 as appropriate to the requirements of specific applications of the embodiments. The vehicle telematics device 110 can be self-powered and/or connected into the electrical system of the vehicle 102 in which the vehicle telematics device 110 is installed. In a variety of embodiments, the vehicle telematics device is powered via the vehicle data bus 112 and/or the I/O interface 114.

In many embodiments, one of the sensor devices of the vehicle telematics device 110 is a Global Positioning System (GPS) receiver in order to determine the location, speed, and/or acceleration of the vehicle 102. In many embodiments, one of the sensor devices of the vehicle telematics device 110 is a multidimensional accelerometer to acquire acceleration and/or speed of the vehicle 102.

In a variety of embodiments, the vehicle telematics device 110 and/or remote server system 130 provides a user interface allowing for visualizing and interacting with the data transmitted and/or received between the systems. In several embodiments, the vehicle telematics device 110 and/or remote server system 130 provides an interface, such as an application programming interface (API) or web service that provides some or all of the data to third-party systems for further processing. Access to the interface can be open and/or secured by using any of a variety of techniques, such as by using client authorization keys, as appropriate to the requirements of specific applications.

Although a specific architecture of a vehicle telematics system in accordance with embodiments are discussed herein and illustrated in FIG. #1, a variety of architectures, including sensors and other devices and techniques not specifically described herein, can be utilized in accordance with embodiments. Furthermore, the processes described herein can be performed by using any combination the vehicle telematics device, mobile communications device, and/or the remote server systems as appropriate to the requirements of specific applications of the embodiments.

Vehicle Telematics Devices and Remote Server Systems

Figure 2A:
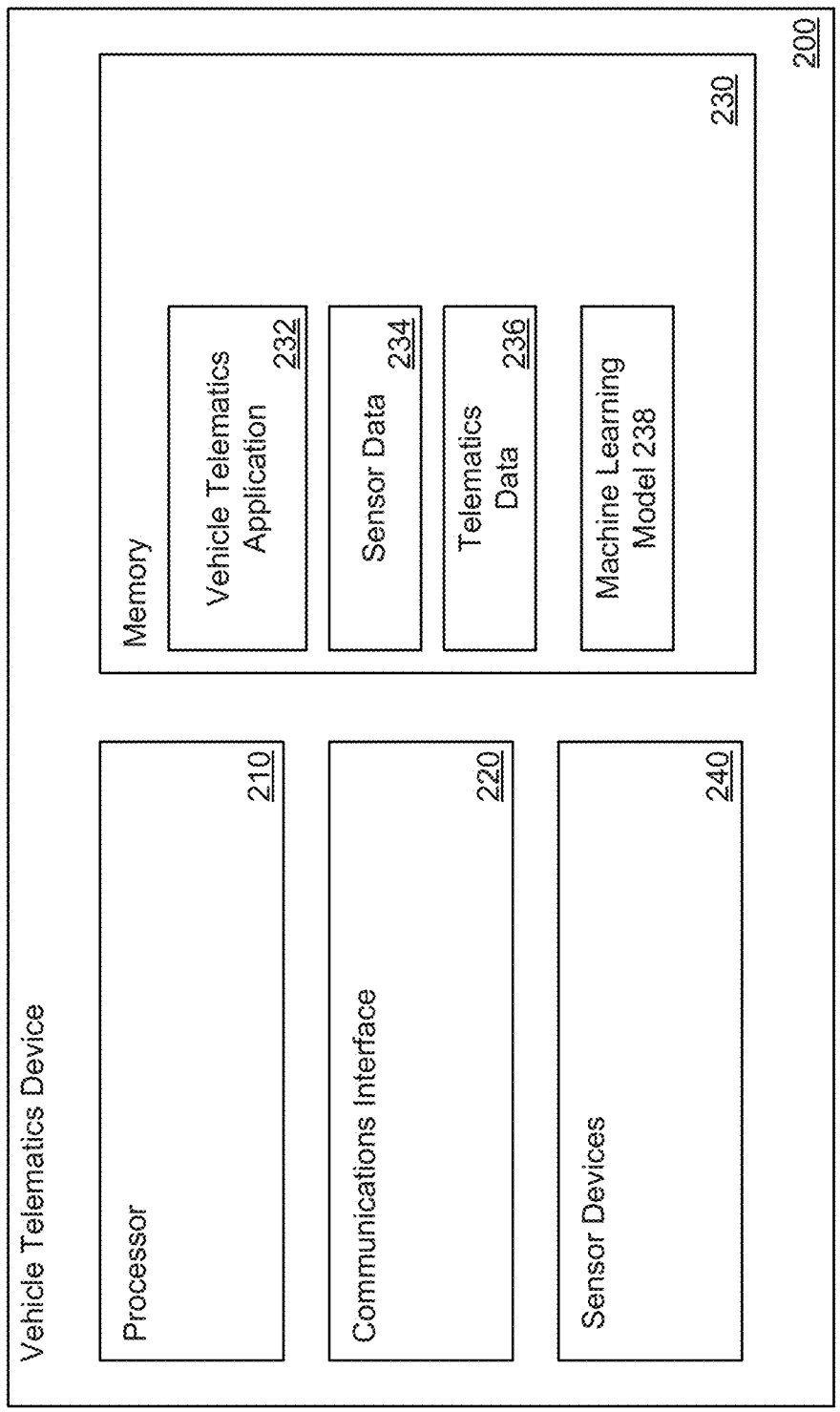
FIG. 2A is a conceptual block diagram of a vehicle telematics device in accordance with an embodiment of the invention

FIG. 2A is a conceptual block diagram of a vehicle telematics device in accordance with an embodiment of the invention. Vehicle telematics devices and remote server systems in accordance with the embodiments can transmit and receive data regarding the vehicle. The vehicle telematics device 200 includes a processor 210 in communication with memory 230. The vehicle telematics device 200 can also include one or more communication interfaces 220 capable of sending and receiving data. In a number of embodiments, the communication interface 220 is in communication with the processor 210, the memory 230, and/or the sensor device(s) 240. In several embodiments, the memory 230 is any form of storage configured to store a variety of data, including, but not limited to, a vehicle telematics application 232, sensor data 234, telematics data 236, and one more machine learning models 238. In many embodiments, the vehicle telematics application 232, sensor data 234, telematics data 236, and/or machine learning models 238 are stored by using an external server system and received by the vehicle telematics device 200 by using the communications interface 220.

Sensor devices 240 can include RPM sensors, voltage sensors, GPS receivers, noise sensors, vibration sensors, acceleration sensors, weight sensors, and any other device capable of measuring data regarding a vehicle as appropriate to the requirements of specific applications of the embodiments. Sensor devices 240 can be included within the vehicle telematics device 200 and/or located external to the vehicle telematics device 200. The vehicle telematics device 200 can communicate with external sensor devices by using the communications interface 220, such as via a vehicle data bus, I/O interface (including serial interfaces), mobile communications device, and/or a network connection as appropriate to the requirements of specific applications of embodiments. In a variety of embodiments, a vehicle telematics device is connected to a diagnostic connector (e.g. an OBD II port) in a vehicle. In some embodiments, information collected from sensor devices 240 and/or sensor data 234 can be in a variety of machine learning processes for identifying a vehicle platform such as a vehicle year, make, and/or model as described in more detail herein. For example, vehicle identification data (e.g., raw data collected by vehicle telematics device) can include identification information from one or more vehicle devices. It should be readily appreciated by one having ordinary skill that these are merely illustrative examples and any such information can be used as appropriate to the requirements of specific applications.

Figure 2B:
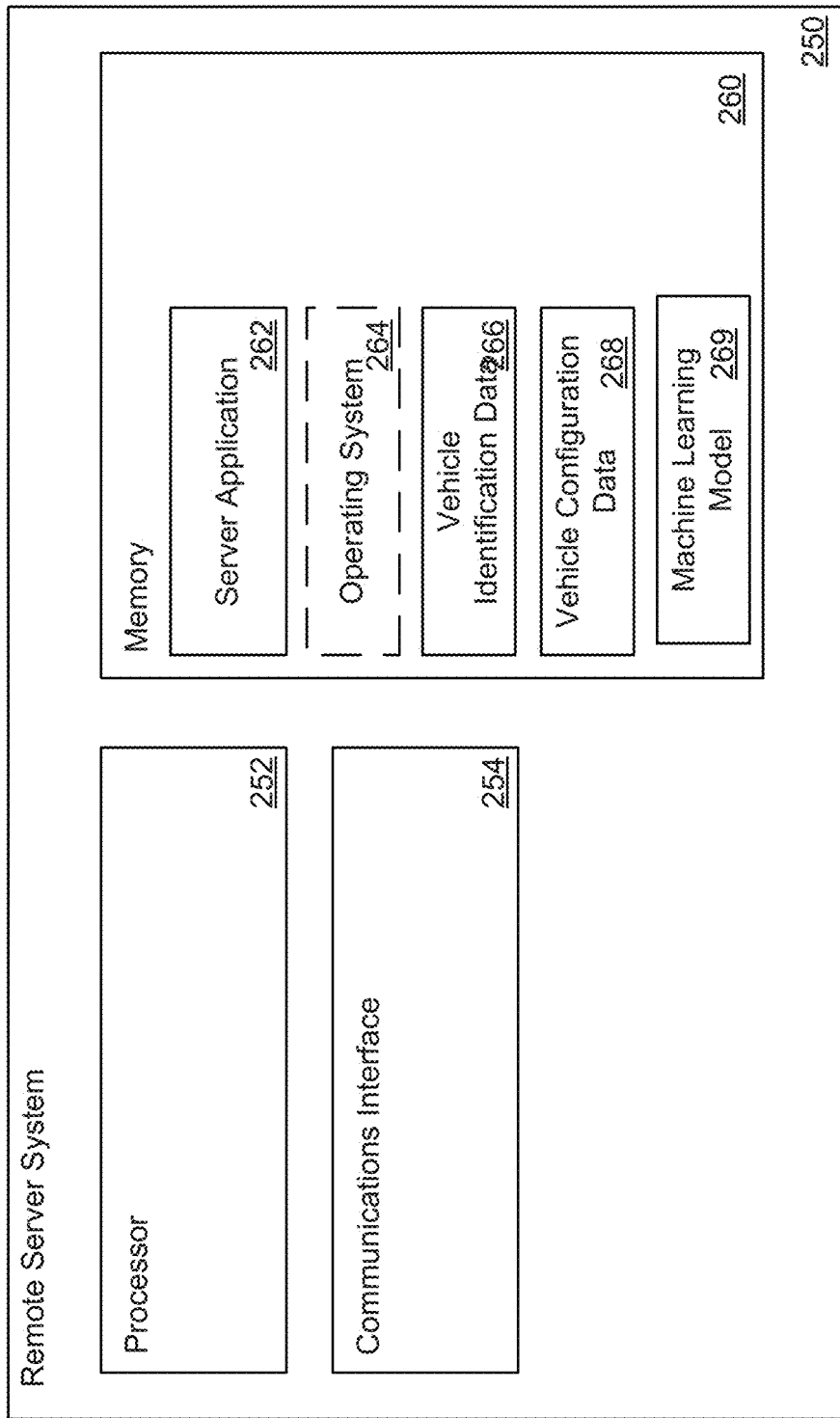
FIG. 2B is a conceptual block diagram of a remote server system in accordance with an embodiment

FIG. 2B is a conceptual block diagram of a remote server system, in accordance with an embodiment. The remote server system 130 includes a processor 252 in communication with memory 260. The remote server system 130 can also include one or more communications interfaces 254 capable of sending and receiving, such as with a vehicle telematics device. In a number of embodiments, the communication interface is in communication with the processor 252 and/or the memory 260. In several embodiments, the memory 260 is any form of storage configured to store a variety of data, including, but not limited to, a server application 262, an operating system 264, vehicle identification data 266, vehicle configuration data 268, and/or one or more machine learning models. In many embodiments, the server application 262, an operating system 264, vehicle identification data 266, vehicle configuration data 268, and/or machine learning models 269 are stored by using an external server system and received by the remote server system 130 by using the remote communications interface 254.

The processor 210 and processor 252 can be directed, by the vehicle telematics application 232 and the server application 262 respectively, to perform a variety of vehicle platform identification processes. Vehicle platform identification processes can include obtaining vehicle bus data and identifying a vehicle platform, including an associated set of vehicle configuration settings (e.g., a set of PIDs), for the particular vehicle platform. In many embodiments, the vehicle platform can be identified by matching identification information obtained from one or more vehicle modules with information stored in a database that includes vehicle platform profiles and associated sets of PIDs for the different vehicle profiles. In several embodiments, a vehicle platform can be identified using a machine learning model that has been pre-trained on a large collection of labeled vehicle bus data obtained from many different vehicles with different platforms (e.g., different YMM, among other variations) in order to classify a particular vehicle based on an analysis of bus data obtained from the vehicle. Vehicle platform identification processes that can be performed in accordance with embodiments are described in more detail herein.

Although specific architectures for vehicle telematics devices and remote server systems in accordance with embodiments are conceptually illustrated in FIGS. 2A-B, any of a variety of architectures, including those that store data or applications (e.g., machine learning models) on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed by using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Integrated Asset Tracker

Figure 3:
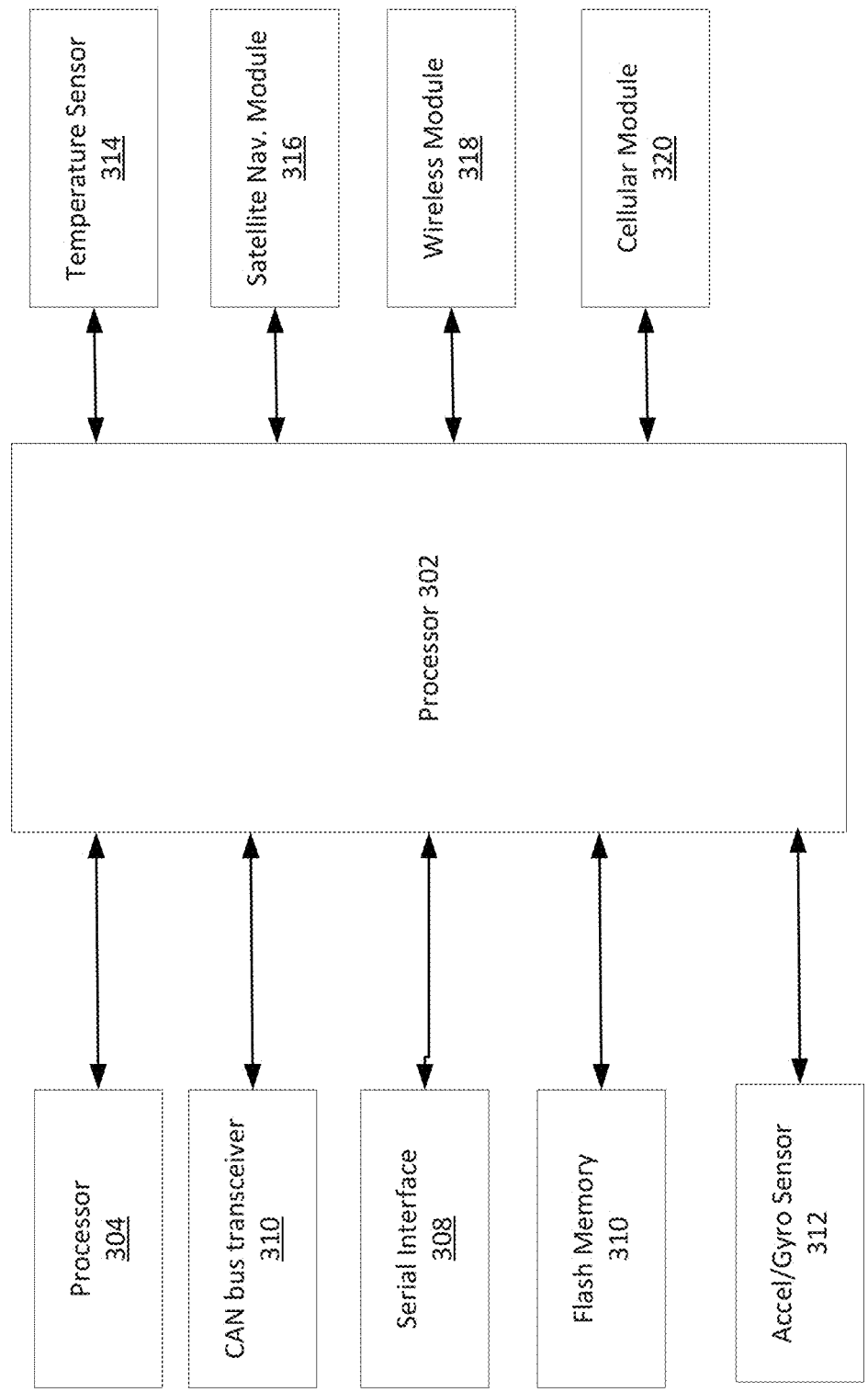
FIG. 3 illustrates a block circuit diagram of components of a telematics device in accordance with an embodiment of the invention.

FIG. 3 illustrates a block circuit diagram of components of a telematics device in accordance with an embodiment of the invention. The block circuit diagram illustrates components that cooperate to provide one or more capabilities of the telematics device, including a processor 302 (e.g., an STM32L496VG or STM32L4A6VG from STMICROELECTRONICS) a communication bus module 3304 (e.g., a 1-Wire communication bus module, such as a DS2484R+T from MAXIM INTEGRATED) connected to the processor over an I2C bus, a CAN bus transceiver 506 (e.g., a CAN H/L MCP2562T-E/MF from MICROCHIP TECHNOLOGY INC.), a serial interface 308 (e.g., a MAX3218EAP RS-232 interface from MAXIM INTEGRATED) with Universal Asynchronous Receiver-Transmitter (UART) support, flash memory 310 (e.g., a W25Q16FWUXIE flash memory module from WINBOND ELECTRONICS) connected via a Serial Peripheral Interface (SPI), an accelerometer and gyroscopic sensor 312 (e.g., an LSM6DSL chip from STMICROELECTRONICS) connected via SPI, a temperature sensor 314 (e.g., a STTS751 temperature sensor by STMICROELECTRONICS) connected via SPI, a satellite navigation module 316 (e.g., a UBX-M8030 from U-BLOX HOLDING AG) connected via UART, a wireless module 318 (e.g., a BLUETOOTH wireless module, such as a BLUENRG-2 module from STMICROELECTRONICS) connected over UART, a cellular module 320 (e.g., a BG96 module or EG91 module from QUECTEL WIRELESS SOLUTIONS CO.) connected via UART. Although FIG. 3 illustrates a circuit diagram of various components of a telematics device, any of a variety of components may be specified as appropriate to the requirements of specific applications in accordance with embodiments of the invention.

Software Architecture

Figure 4:
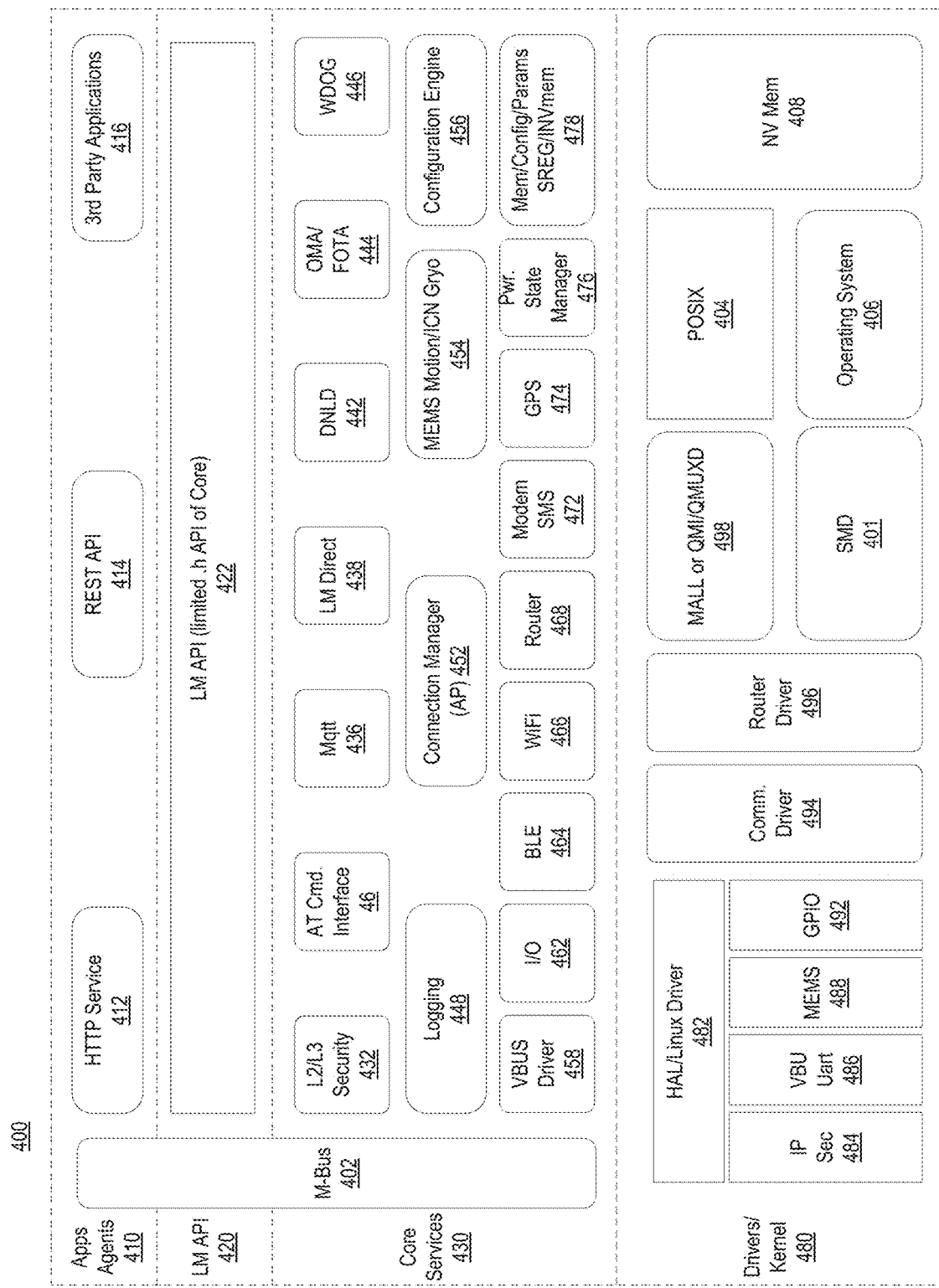
FIG. 4 illustrates a software architecture for use with telematics devices in accordance with an embodiment of the invention.

FIG. 4 illustrates a software architecture 400 for use with telematics devices described herein in accordance with an embodiment of the invention. The software architecture 400 is an example software architecture for providing one or more of the features and capabilities of the telematics device. The software architecture 400 includes a message bus 402, an application/agent layer 410, an LM API layer 420, a core services layer 430, and a driver/kernel layer 480. The application/agent layer 410 includes an HTTP service 412, a REST API 414, and 3rd party applications 416. The LM API layer 420 includes an LM API 422 (e.g., a limited header API of the core services). The core services layer 430 includes an L2/L3 security service 432, an AT command interface service 434, an MQTT (Message Queuing Telemetry Transport) service 436, an LM direct service 438, a DNLD service 442, an OMA/FOTA service 444, a WDOG service 446, a logging service 448, a connection manager service 452, a MEMS motion/ICN Gyro service 454, a configuration engine 456, a VBUS driver 458, an I/O service 462, a BLUETOOTH LE service 464, a WIFI service 466, a router service 468, a modem SMS service 472, a GPS service 474, a power state manager service 476, and a memory/configuration/parameter SREG INVmem service 478. The drivers/kernel layer 480 includes a HAL (Hardware Abstraction Layer)/Linux driver, an IP sec module 484, a VBU UART module 486, a MEMS module 488, a GPIO module 492, communication drivers 494 (e.g., drivers for HOSTAP, WIFI, or BLUETOOTH LE), a router driver 496 (e.g., IPTABLES), MALL/QMI/QMUXD drivers 498, SMD drivers 401, a POSIX interface 404, an operating system 406 (e.g., a LINUX operating system or a real time operating system such as THREADX), and an NV memory module 408. A telematics device can use the configuration engine 456 and one or more scripts to perform one or more vehicle platform identification and telematics device configuration processes. Although FIG. 4 illustrates a particular software architecture of a telematics device with automatic vehicle identification and configuration features, any of a variety of software architectures for the telematics device may be utilized as appropriate to the requirements of specific applications in accordance with embodiments of the invention.

Telematics Device Configurations for Different Vehicle Modules

Figure 5:
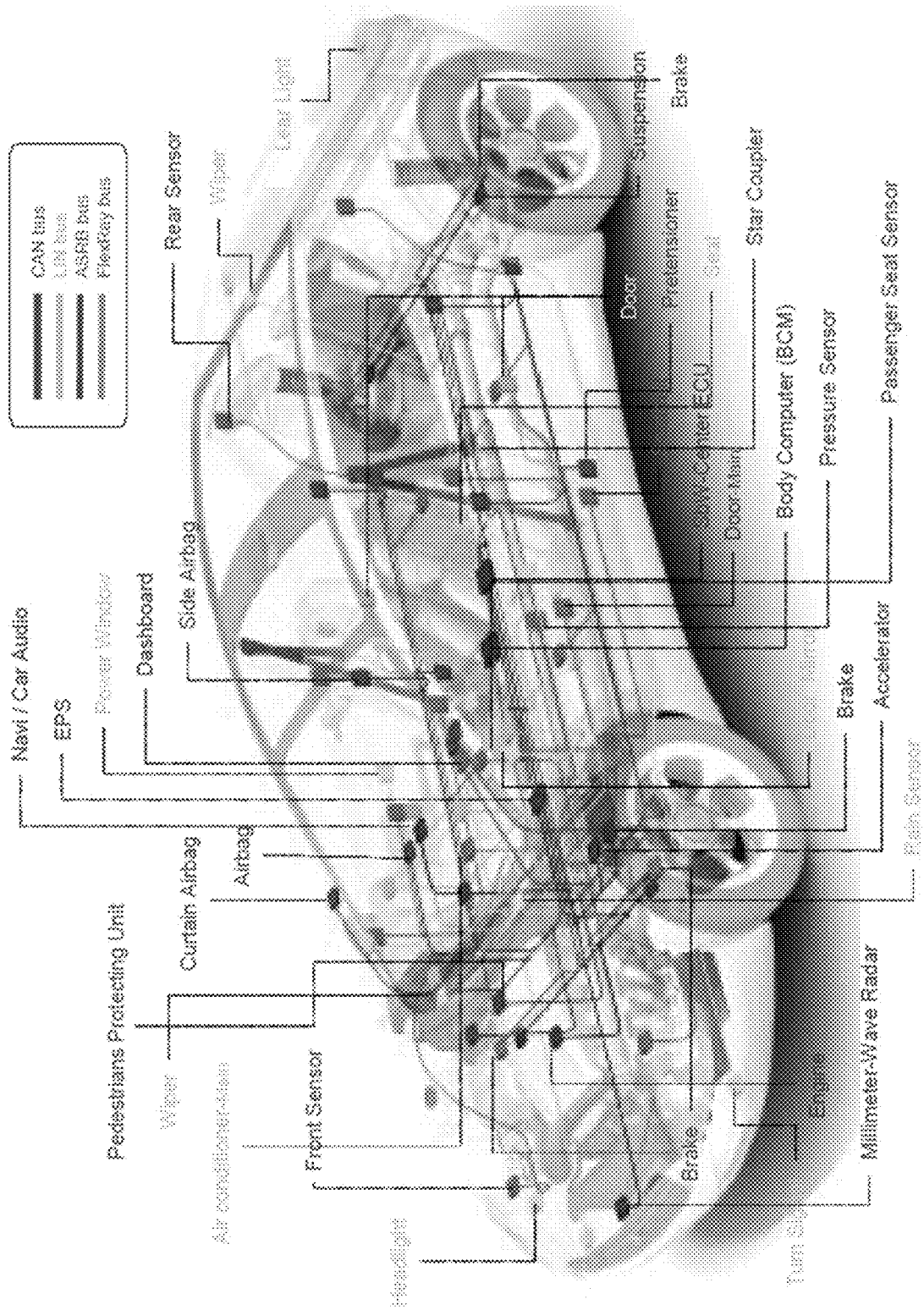
FIG. 5 illustrates an example of different vehicle modules that may exist on a vehicle in accordance with an embodiment of the invention.

Different vehicles with different YMM may include many different vehicle modules communicating on the vehicle bus and a telematics device in accordance with many embodiments of the invention can be configured (e.g., during installation) to enable communication with the various vehicle modules based on the particular communication platform associated with the vehicle. As such a telematics device can be installed in a variety of different vehicles and automatically detect and select configuration settings for each different vehicle based on data received from the vehicle modules on the vehicle. FIG. 5 illustrates an example of different vehicle modules that may exist on a vehicle, including some of the core vehicle devices, including the Engine Control Unit (ECU), navigation, car audio control units, airbag control units, brake control unit, suspension control, door sensors, along with other vehicle devices that may be provided on a smaller subset of vehicles, including, for example, millimeter-wave radar, pedestrians protecting unit, curtain airbag, among various other vehicle modules. Accordingly, many embodiments of the telematics device are able automatically identify and set configuration settings for communication on a particular vehicle platform with the configuration specifically set according to the particular set of vehicle modules that exist within a particular vehicle. Accordingly, a telematics device can determine a particular platform associated with a vehicle, and obtain configuration settings, including a particular set of PIDS, that enable the device to communicate with the set of vehicle devices on the vehicle. In many embodiments, the platform can be identified based on an analysis of different types of identification information obtained from several different vehicle modules on the vehicle.

In many embodiments, different vehicle modules may provide different types of identification information on the vehicle bus and this information can be matched to information stored in a database that has been reverse engineered for a vehicle having a same or similar platform (e.g., a same or similar set of vehicle devices). Accordingly, the configuration settings that have been reverse engineered for a vehicle of a same or similar platform can be used for a new vehicle having provided a set of matching identification data.

In many embodiments, a platform from many different platforms can associated with a particular vehicle type that includes a particular set of vehicle modules. In many embodiments, reverse engineering may be utilized to determine the configuration settings for different vehicle types with different sets of vehicle modules. A platform can be used for different vehicles that have the same vehicle modules. For example, vehicles from different manufacturers that use a same vehicle modules can be associated with a same platform. Accordingly, through reverse engineering many different vehicles with different vehicle modules, a database can be generated that includes many different platforms for different vehicle types. FIG. 7 illustrates an example of different types of identification data that can be used to identify different types of vehicle platforms in accordance with an embodiment of the invention. As illustrated, a VW/AUDI platform can be identified using an ASAM/ODX File ID, whereas an Alfa Romeo can be identified using a hardware of software ID. Accordingly, different vehicle modules may provide different types of identification data or data that can be used to identify a vehicle on the vehicle bus, which can be collected through reverse engineering and stored for use in identifying new, unknown vehicle types and the associated platforms for those vehicles. FIG. 8 illustrates an example of different types of vehicle modules that can be available for different types of vehicles in accordance with an embodiment of the invention. For example, a VW/AUDI that has been reverse engineered can have a steering assist module, a BCM module, Engine module, TCM module, Airbag module, among numerous others. Furthermore, a bus type, speed, request CAN ID, and Response CAN ID can be collected for each module. As such, for example, an unknown vehicle module that provides a same Resp CAN ID as that which has been previously stored for a VW/AUDI can be used to identify the vehicle. Upon identifying the vehicle, it can further be used to identify a vehicle platform and an associated set of configuration settings for the vehicle.

Figure 6:
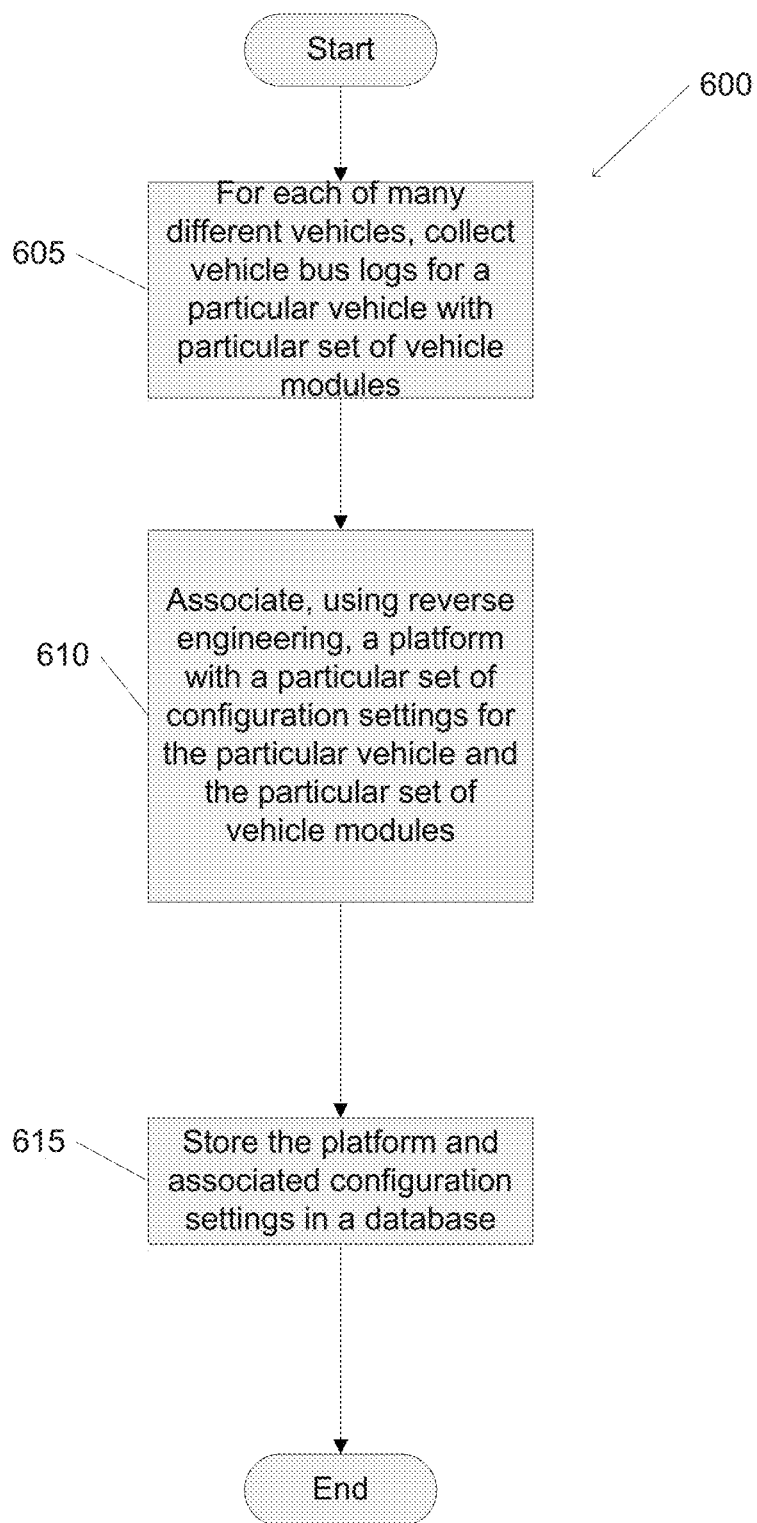
FIG. 6 illustrates a process for generating a set of vehicle platforms for different vehicles in accordance with an embodiment of the invention.

A process for generating a set of vehicle platforms for different vehicles in accordance with an embodiment of the invention is illustrated in FIG. 6. The process 600 selects (605) a particular vehicle with a particular set of vehicle modules for many different vehicle types and collects vehicle bus logs for the particular vehicle. Different vehicle types can include vehicles with different sets of vehicle modules from different manufacturers, among many other differences. In many embodiments, different vehicle types include vehicles with different makes, models, years, trim levels, geographic regions, after-market customizations, among various other manufacturing and production differences such that each different vehicle type may need different sets of configuration settings for communicating with the particular set of vehicle modules available on a particular vehicle. In many embodiments, vehicles from different manufacturers can be associated with a same vehicle platform, for example, vehicles that have the same set of vehicle modules from the same set of manufacturers, same version numbers, among other constraints can communicate using the same set of configuration settings. The process can use reverse engineering to identify a set of configuration settings for each vehicle device on the vehicle and store the configuration settings for the platform associated with the vehicle. In many embodiments, the process may use a trial and error technique to determine the configuration settings for communicating with different vehicle devices on a particular vehicle.

In many embodiments, the reverse engineering can include analyzing vehicle bus logs in order to map particular PIDs to particular vehicle modules and storing the PIDs in a database. Furthermore, the bus logs can be used to extract identifiable sets of data for identifying a particular vehicle module, with different vehicle modules providing different types of identifiable data. For example, as illustrated in FIG. 7, identifiable data can include associating any one of a manufacturer information, software ID information, hardware ID, version number, ODX file number, ISO code, Serial number, Diagnostic ID, Part Number, ECU part number, among many other types of data that can be used for identification of a vehicle module and/or a vehicle type. This identification data can be stored in a database and used to match new identification data received for an unknown vehicle with a platform associated with the vehicle.

The process associates (610) a platform with a particular set of configuration settings for the set of vehicle devices on the particular vehicle. In many embodiments, the process can determine a complete list of vehicle devices that will be available on a particular vehicle based on the platform associated with the vehicle.

The process stores the platform and associated configuration settings in a database. The process ends. Specific processes for generating a set of vehicle platforms through reverse engineering in accordance with embodiments of the invention are described above and shown with respect to FIG. 6; however, any number of processes and protocols can be utilized as appropriate to the requirements of a specific applications in accordance with embodiments of the invention.

In many embodiments, the configuration of a telematics device is configured specifically based on information obtained from the individual vehicle modules that exist on the vehicle, which may be different for different vehicles, even from the same year, manufacturer and model. In particular, different vehicle modules may have different hardware numbers, firmware number, ODX file versions, among various other identifying information, and a telematics device can be configured to include a specific set of PIDs for the particular vehicle in which the module is installed.

Figure 9:
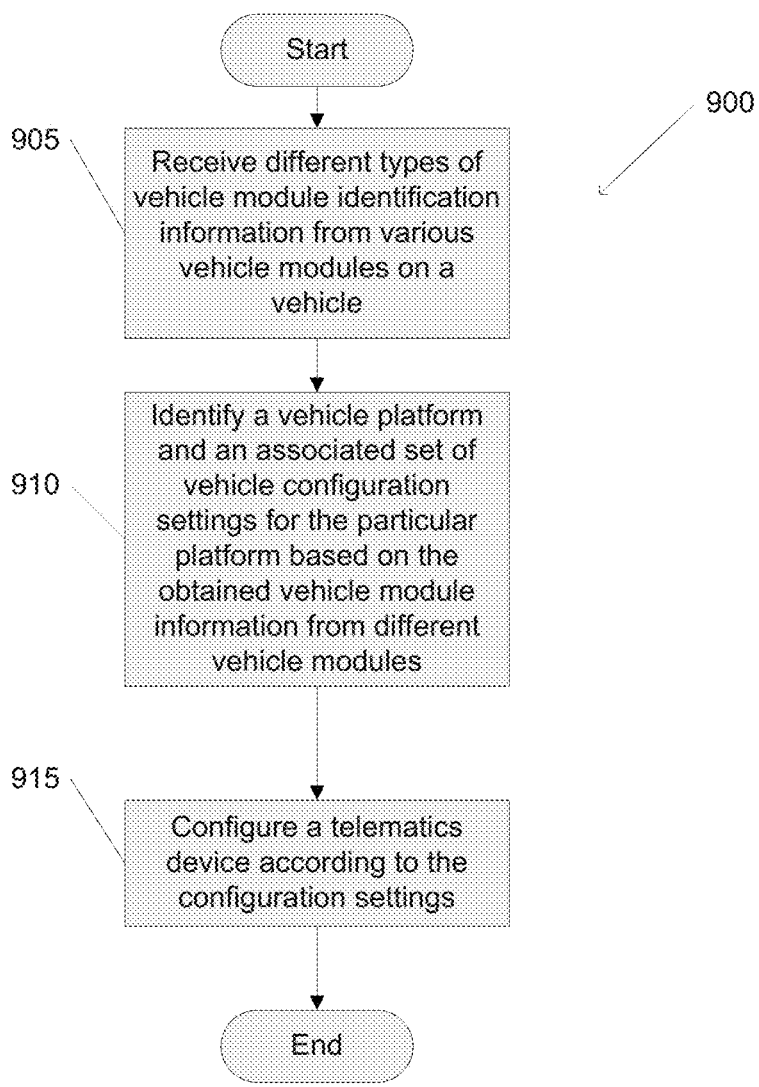
FIG. 9 illustrates a process for obtaining identifying information from vehicle devices and configuring a telematics device accordingly in accordance with an embodiment of the invention.

A process for obtaining identifying information from vehicle devices and configuring a telematics device accordingly in accordance with an embodiment of the invention is illustrated in FIG. 9. The process receives (905) vehicle module identification information for various different vehicle modules on a vehicle. In many embodiments, the process can obtain the vehicle module identification information by requesting the information from the vehicle devices by sending one or more different protocol request messages to the vehicle devices on the vehicle bus. In many embodiments, the vehicle module identification information can include any of a variety of different types of information that can be used to identify the vehicle and/or the vehicle module, including a software ID, hardware ID, firmware ID, ODX file version, among various other identifying information. In many embodiments, the process can obtain several different types of identifying information from several different vehicle modules and based on the collection of identifying information, determine a platform associated with the particular vehicle. For example, the process may obtain a hardware ID from a first vehicle device, a software ID from a different second vehicle device, and a vehicle device identifier from a third vehicle device, and based on the collection of identification information, determine that a particular platform is associated with the vehicle. In particular, the process may match the different types of identifying information with information stored in a database to determine a platform for the vehicle. Accordingly, different types of identifying information can be utilized to identify a vehicle platform. In many embodiments, the process can normalize the different types of identifying information from different vehicles into a normalized format. For example, each vehicle module manufacturer can use a particular data format, and the process can normalize the different formats.

The process identifies 910 a vehicle platform and an associated set of configuration settings, including a set of vehicle PIDs for the particular platform based on the obtained vehicle module information. In many embodiments, the process can access one or more databases on one or more servers, where the database can include information regarding different sets identifying information for different vehicle modules and an associated set of configuration settings (e.g., PIDs) for the particular vehicle modules. In many embodiments, the process can identify a closest matching platform that has been stored in a database that includes similar matching information. In several embodiments, the process can do different types of analysis to identify a similar platform, including identifying a stored platform with matching identifiers, manufacturers, device IDs, software IDs, Hardware IDs, among various other types of identification data that can be utilized as appropriate to the requirements of specific applications in accordance with embodiments of the invention.

In certain embodiments, the process can identify vehicle module configuration settings for each vehicle module by matching returned information from a vehicle module with previously stored information in a database.

In many embodiments, the information stored in the database may be determined through reverse engineering of different vehicles and vehicle modules in order to determine the platform of a vehicle YMM and the set of vehicle modules that may exist on different vehicle types. In many embodiments, a platform can identify a complete set of vehicle devices that exist on a particular vehicle and a complete set of configuration settings for communicating with all of the vehicle devices on the vehicle.

Furthermore, in many embodiments, one or more databases on one or more servers can include information regarding associations between sets of configuration settings (e.g., PIDs for communicating on a vehicle CAN bus) and particular vehicle modules. For example, a vehicle module manufactured by a certain manufacturer can be associated with a set of configuration settings. By providing a granular association between sets of configuration settings and specific vehicle modules, and an association between platforms and different vehicle types, the process improves the ability of telematics devices to communicate with different vehicle devices on which the telematics devices are installed.

The process configures (915) a telematics device according to the configuration settings. In many embodiments, the process can send a set of PIDs to a telematics device on the vehicle. The process ends. Specific processes for configuring a telematics device based on an identification of a vehicle platform in accordance with embodiments of the invention are described above and shown with respect to FIG. 9; however, any number of processes and protocols can be utilized as appropriate to the requirements of a specific applications in accordance with embodiments of the invention.

Vehicle Platform Identification Using Machine Learning on can Bus Traffic

In many embodiments, a telematics device can be configured for a particular vehicle using identification information obtained using machine learning on the vehicle bus data. In certain embodiments, vehicle identification data obtained from the vehicle modules can be supplemented with a machine learning analysis of the vehicle can bus data to determine a platform associated with the vehicle.

In particular, many embodiments may use supervised learning classifiers to identify vehicle platforms using a training data set of labeled vehicle bus data obtained from a large collection of different vehicles. In particular, a neural network model can be trained using a collection of vehicle CAN bus data obtained from different vehicles with different platforms (e.g., make, model, year, manufacturer, trim, among other differences) and new vehicles can be identified by running the model on a small collection of bus data obtained from the vehicle. Vehicle telematics systems in accordance with a variety of embodiments can utilize a variety of advance machine learning techniques to identify a vehicle platform and determine a vehicle profile associated with the platform.

In many embodiments, unsupervised learning classifiers (e.g., clustering, neural networks, and/or other classifiers) can identify relationships in uncategorized vehicle bus data to identify related vehicle platforms, in accordance with many embodiments of the invention. Unsupervised learning classifiers can group different sets of vehicle bus data by doing cluster analysis to determine relationships between different sets of bus data. These groups in data points can generally indicate that bus data from a particular vehicle is related to a particular platform.

The machine learning classifier can include any of a variety of classifiers including (but not limited to) supervised learning classifiers, unsupervised learning classifiers, and/or a combination of several classifiers. Supervised learning classifiers can include (but are not limited to) artificial neural networks, nearest neighbor algorithms, decision trees, support vector machines, random forests, ensembles of classifiers, and/or a combination of supervised learning classifiers. In a variety of embodiments, supervised learning classifiers can be further adapted to be unsupervised learning classifiers for the identification of vehicle platform classification as appropriate to the requirements of specific applications of embodiments. Unsupervised learning classifiers can include (but not limited to) k-means clustering, mixture models, hierarchical clustering, anomaly detection, artificial neural networks, expectation-maximization algorithms, principal component analysis, independent component analysis, singular value decomposition, isolation forests, and/or a combination of unsupervised learning classifiers.

The system can parallelize the computations of the machine learning classifiers (e.g., ensemble isolation forests) across as many processing cores that are available. For example, if a server has n processors, then each of the n processors can work to perform computations for one or more machine learning classifier (e.g., one isolation forest). In certain embodiments, one or more devices on a vehicle may perform the machine learning. In several embodiments, a telematics device can utilize the processing resources of a smart phone or other connected device to perform the machine learning processes.

In many embodiments, a neural network can be executed on a telematics device, whereby the telematics device can obtain vehicle bus data from the vehicle in which it is installed and provide the vehicle bus data to a machine learning model on the device. In several embodiments, a telematics device can provide some or all of a vehicle bus data for a time period to a server and the server can execute the machine learning model on the bus data to identify a vehicle platform. In certain embodiments, any combination of telematics devices, smart phones, tablets and/or servers can work to perform computations for one more machine classifiers as appropriate to the requirements of specific applications in accordance with embodiments of the invention.

Supervised Machine Learning Systems

In many embodiments, a supervised learning classifier may be used to identify vehicle platforms based on vehicle bus data. A known (or labeled) set of vehicle bus data, which can be referred to as a training set, can be used to train the machine learning classifier. Once the machine learning classifier is trained by using the labeled training set, the machine learning classifier can classify unknown sets of vehicle bus data. Correctly classified data can be added to the training set to continuously improve the performance of the machine learning system. Similarly, information related to incorrectly classified vehicle bus data can also be added to the training data set to improve the precision of the machine learning system.

Supervised machine learning classifiers analyze information, in particular, vehicle bus data collected by vehicle telematics devices from many different types of vehicles with different platforms to classify the vehicle to a particular platform. Supervised learning classifiers identify relationships in labeled vehicle bus information. A known (or labeled) set of vehicle telematics device information, which can be referred to as a training set, is used to train the machine learning classifier. Once the machine learning classifier is trained by using the labeled training set, the machine learning classifier classifies unknown sets of vehicle bus information. Correctly classified information is added to the training set to continuously improve the performance of the machine learning system. Similarly, information related to incorrectly classified vehicle bus data can be added to the training data set to improve the precision of the machine learning system.

Figure 10:
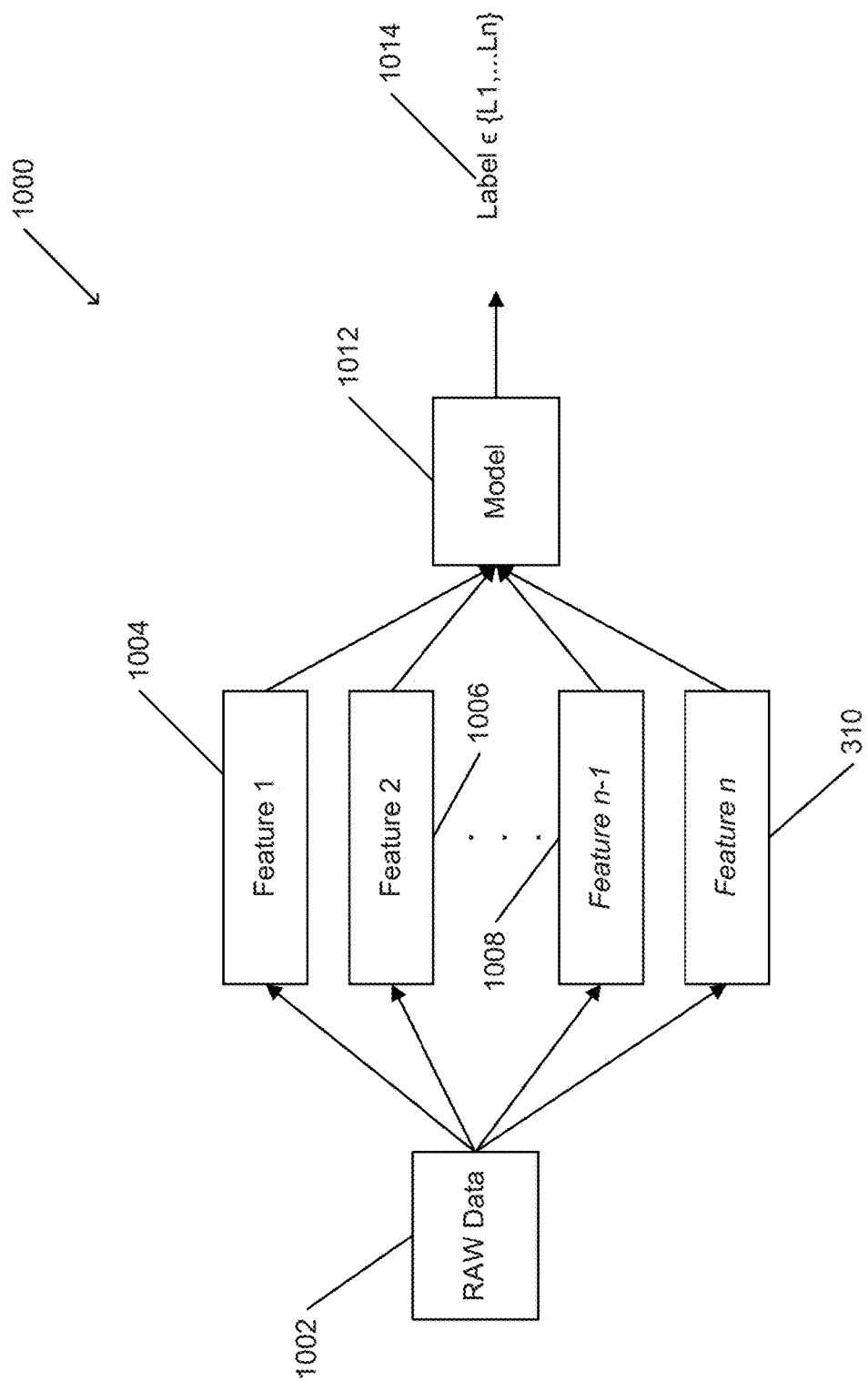
FIG. 10 is a conceptual block diagram of a supervised machine learning system in accordance with an embodiment of the invention.

FIG. 10 is a conceptual block diagram of a supervised machine learning system 1000. The system 1000 receives raw vehicle bus data 1002 from one or more vehicle telematics devices installed in one or more different vehicles. From the raw bus data 1002, the system 1000 performs feature extraction to generate Feature 1 through Feature n. In many embodiments, each feature may correspond to a data field within the bus data 1002. Example data fields for an example CAN vehicle bus for a particular vehicle are described with reference to FIG. 11, and can include CAN Port, Message ID, Message payload, among other data-fields within the CAN bus data. In many embodiments, the Message ID corresponds to an identifier for a vehicle module on the vehicle bus. The system 1000 inputs the features into a model 1012, which classifies the vehicle bus to a particular Label 1 . . . N.

Figure 11:
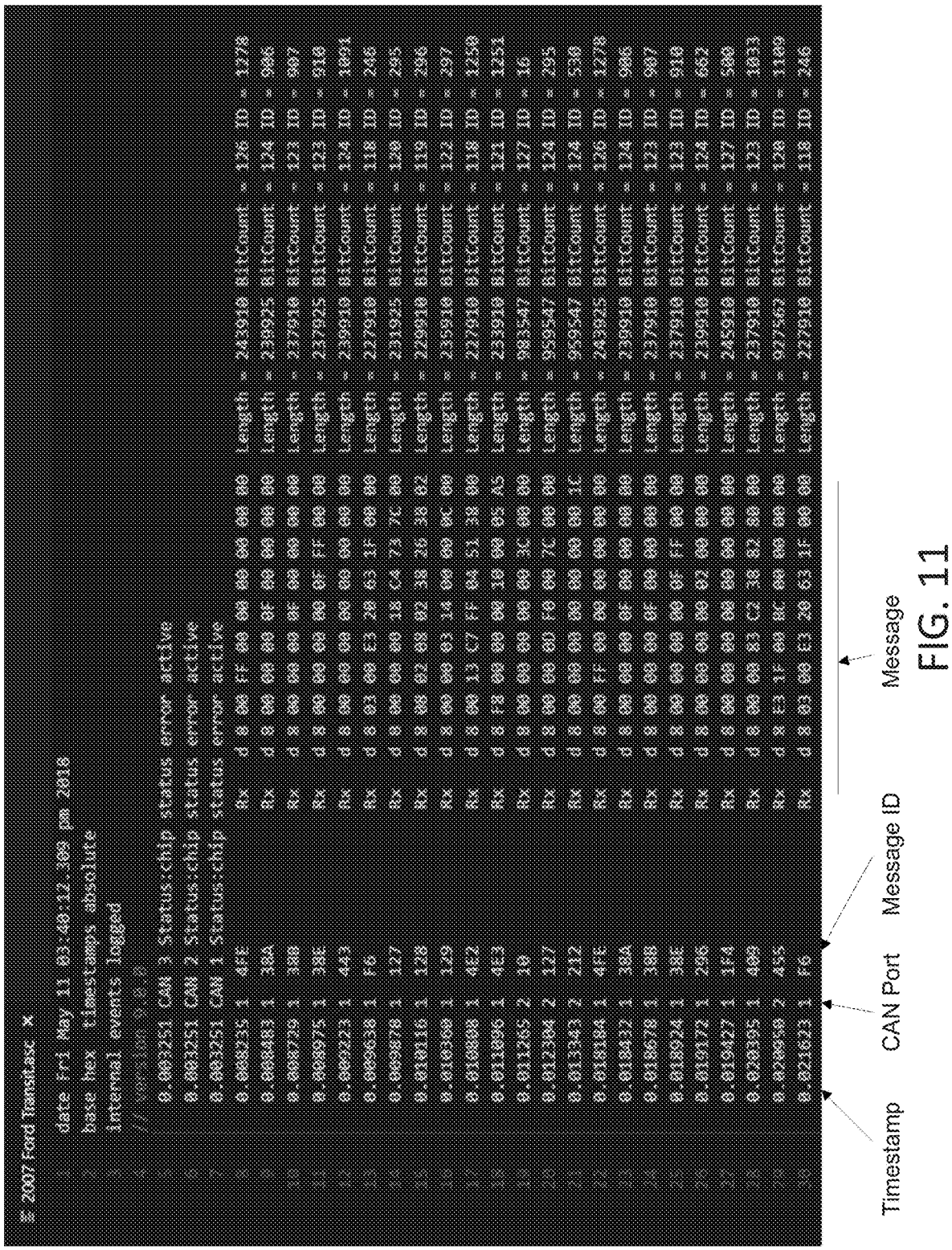
FIG. 11 illustrates an example of a vehicle CAN bus data log for a particular vehicle that can be used for training a machine learning model in accordance with an embodiment of the invention.

In many embodiments, a machine learning model can be trained on collected vehicle bus data patterns and statistics. In many embodiments, the machine learning model can be trained on a frequency of a particular vehicle module ID (e.g., Message ID da-field for CAN Bus data) appearing within the bus traffic within a set time period. An example of a vehicle CAN bus data log for a particular vehicle that can be used to train a machine learning model in accordance with an embodiment of the invention is illustrated in FIG. 11. In particular, the CAN bus data can include a timestamp, CAN Port, Message ID (e.g., vehicle module ID), and Message payload, among various other data-fields and information. In this example, the data is captured for a vehicle that is a 2007 Ford Transit. Within this particular time frame illustrated in FIG. 11, ranging from time stamp 0.003251 to 0.0212623, various different Message IDs are indicated, including 4FE, 38A, 38B, 38E, among numerous others. In many embodiments, bus statistics can be determined for the vehicle CAN bus data in order to provide an electronic signature for the vehicle can bus data. In many embodiments, a frequency of the Message ID may be used to train a neural network for different vehicles. As illustrated in FIG. 11, the Message ID "4FE" is seen two times within the particular time frame. A frequency for each of the different Message IDs can be calculated and used to train a neural network to identify new vehicles based on similar CAN bus statistics (e.g., other bus data having a set of Message IDs with similar frequencies). In many embodiments, a vehicle telematics device can collect a small sample of a CAN bus data from a vehicle on which the telematics device is installed and compute a frequency and Message ID statistics, and the vehicle telematics device can provide this information to a server, whereby the server can classify run the bus statistics using a trained machine learning model to identify a vehicle platform. In particular, many embodiments can reduce the bandwidth requirements of providing the bus data from a telematics device on a vehicle to a server by computing and providing only the Message ID and frequency information, and removing or not sending the remaining information available in the CAN bus data log, including, for example the Message payload overhead. Many embodiments of the machine learning model can be trained on different data fields using different statistical analysis and/or pattern recognition processes of the vehicle bus data, including analyzing the Message payload data field, as appropriate to the requirements of specific applications. Processes for using machine learning to identify vehicle platforms in accordance with embodiments of the invention are described herein.

Figure 12:
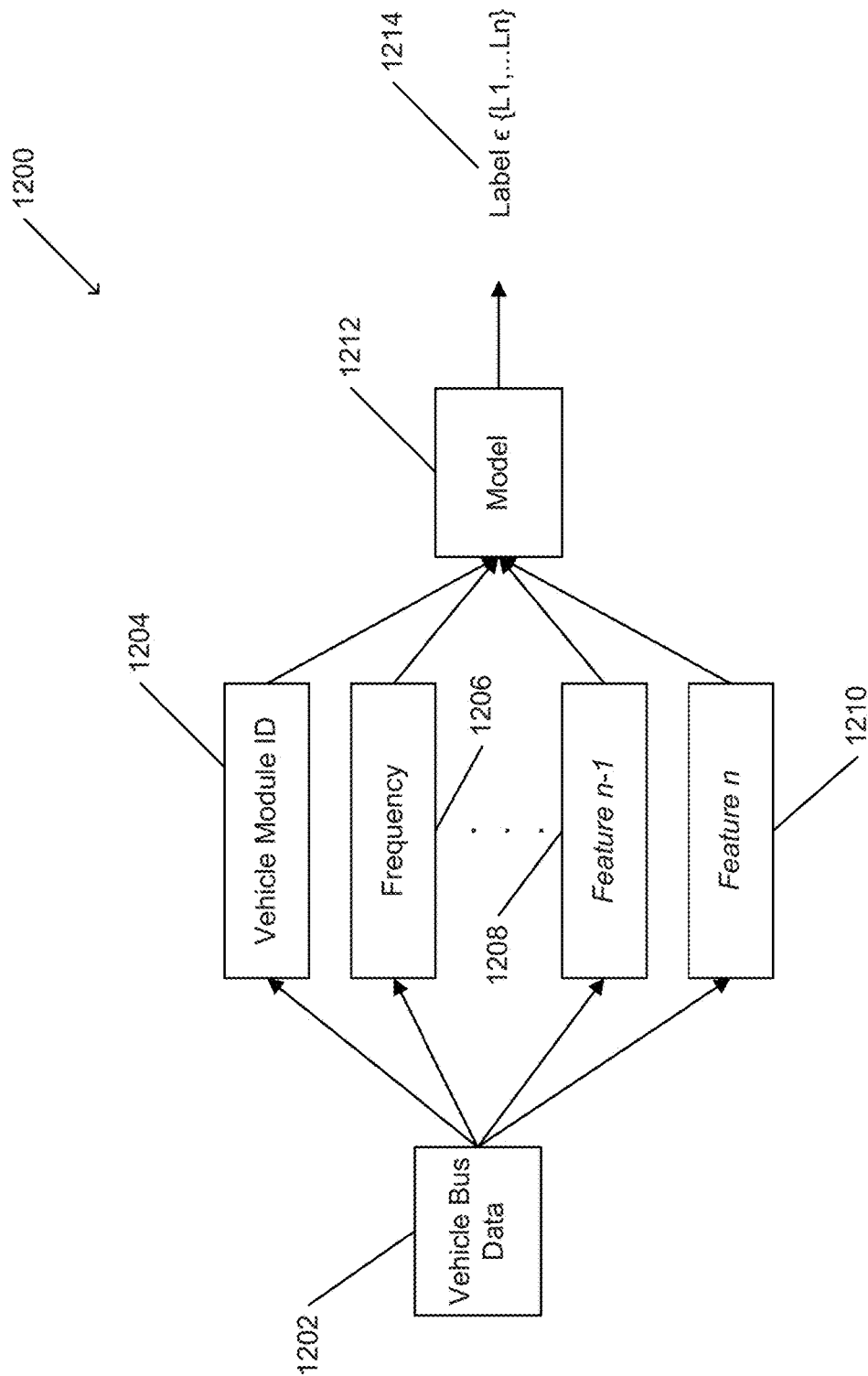
FIG. 12 is a conceptual block diagram of a supervised machine learning system, including example feature extraction of information from the available vehicle bus data in accordance with an embodiment of the invention.

FIG. 12 is a conceptual block diagram of a supervised machine learning system, including example feature extraction of information from the available vehicle bus data. The system 1200 receives vehicle bus data 1202 from one or more vehicle telematics devices. From the vehicle bus data 1202, the system 1200 performs feature extraction to extract one or more fields from the vehicle bus data, which may include extracting a vehicle module ID description, among various other features. In many embodiments, each feature can be a data field within the vehicle bus data 1202. In many embodiments, at the feature extraction stage, the system may also analyze the vehicle bus data and compute a frequency of a particular data field. In many embodiments, a frequency of a vehicle module ID (e.g., Message ID) data field may be utilized. In many embodiments, a vehicle module ID data field is unique to each vehicle module or node on the vehicle bus and can be used to identify the vehicle module sending a message on the bus. In many embodiments, the vehicle module ID number may be assigned a priority rank based on the importance of the vehicle device such that vehicle devices with higher priorities are processed on the vehicle bus over those with lower priorities. For example, a vehicle device such as the vehicle braking system may have a higher priority message for filtering purposes over a radio vehicle device. In this example, the system inputs the features into a model 1212, which assigns a label (e.g., $L_1 \ldots, L_n$) to the data. In many embodiments, the model 1212 is a neural network that may be trained on a large collection of vehicle bus data from different vehicle platforms. In many embodiments, the model 1212 may be trained on particular sets of vehicle bus data, including a frequency of a vehicle module ID appearing within a set time period (e.g., 10 seconds) of a vehicle bus message log, which may be used as a vehicle's "electronic signature" similar to a person's fingerprint. Different models may be trained using different types of analysis of the vehicle bus data, including pattern, statistical, or contextual analysis. Furthermore, different data fields of the vehicle bus data may be analyzed as appropriate to the requirements of specific applications in accordance with embodiments of the invention. Although FIG. 12 illustrates using a frequency and vehicle module ID for training a neural network, any of a variety of bus data fields may be utilized as appropriate to the requirements of specific applications in accordance with embodiments of the invention.

Unsupervised Machine Learning Systems

Unsupervised machine learning systems, in accordance with embodiments, are designed to solve problems associated with rule-based algorithms and supervised learning systems that may need a labeled data set for training. Unsupervised machine learning classifiers can analyze vehicle bus data collected by vehicle telematics devices to identify a vehicle platform. Unsupervised learning classifiers (e.g., clustering, and/or other classifiers) can identify relationships in uncategorized vehicle bus data to generate groups of related vehicles with similar electronic signatures based on the bus data.

Figure 13:
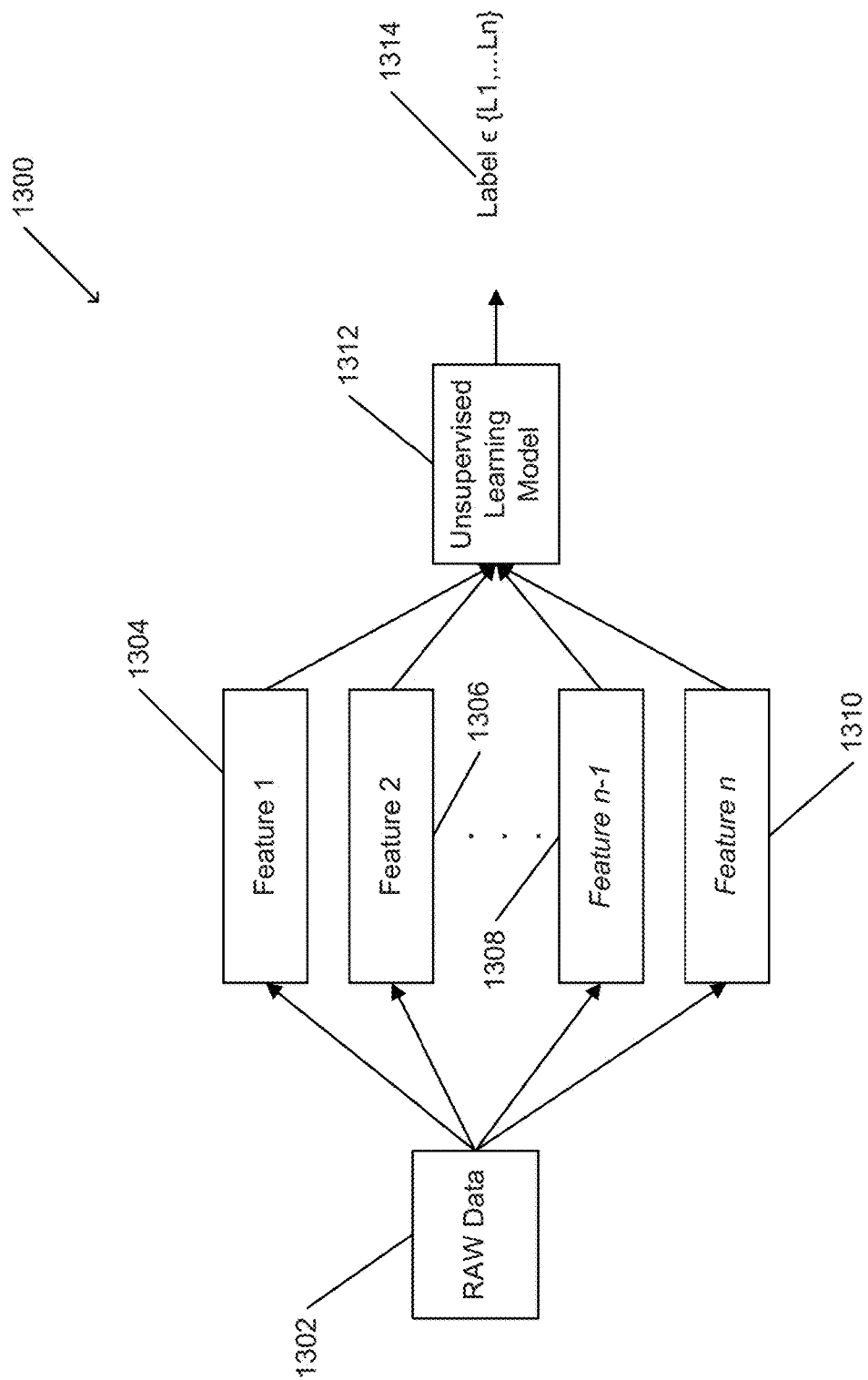
FIG. 13 is a conceptual block diagram of an unsupervised machine learning system in accordance with an embodiment

FIG. 13 is a conceptual block diagram of an unsupervised machine learning system 1300, in accordance with an embodiment. The system 1300 receives raw vehicle bus data 1302 from one or more vehicle telematics devices. The system receives a set of features for data extraction. For example, a human can determine that the system 1300 will extract data associated with the following features: vehicle module ID. Each feature can be associated with a data-field within the raw vehicle bus data 1302. Example data-fields for a CAN vehicle bus in accordance with an embodiment of the invention are described with reference to FIG. 11. From the vehicle bus data 1302, the system 1300 can perform feature extraction to generate data associated with Feature 1 through Feature n. The system 1300 inputs the features into an unsupervised learning model 1312, which assigns a label (e.g., L1, . . . , $L_n$) to the data. Unsupervised learning classifiers for the model 1312 can include (but are not limited to) k-means clustering, nearest neighbor, mixture models, hierarchical clustering, anomaly detection, artificial neural networks, expectation-maximization algorithms, principal component analysis, independent component analysis, singular value decomposition, isolation forests, and/or a combination of unsupervised learning classifiers. Although FIG. 13 illustrates using an unsupervised learning model, any of a variety of machine learning techniques may be utilized for vehicle platform identification as appropriate to the requirements of specific applications in accordance with embodiments of the invention. Many embodiments may utilize an unsupervised clustering machine learning technique whereby a model can group raw vehicle data into groups with similar electronic signatures.

Figure 14:
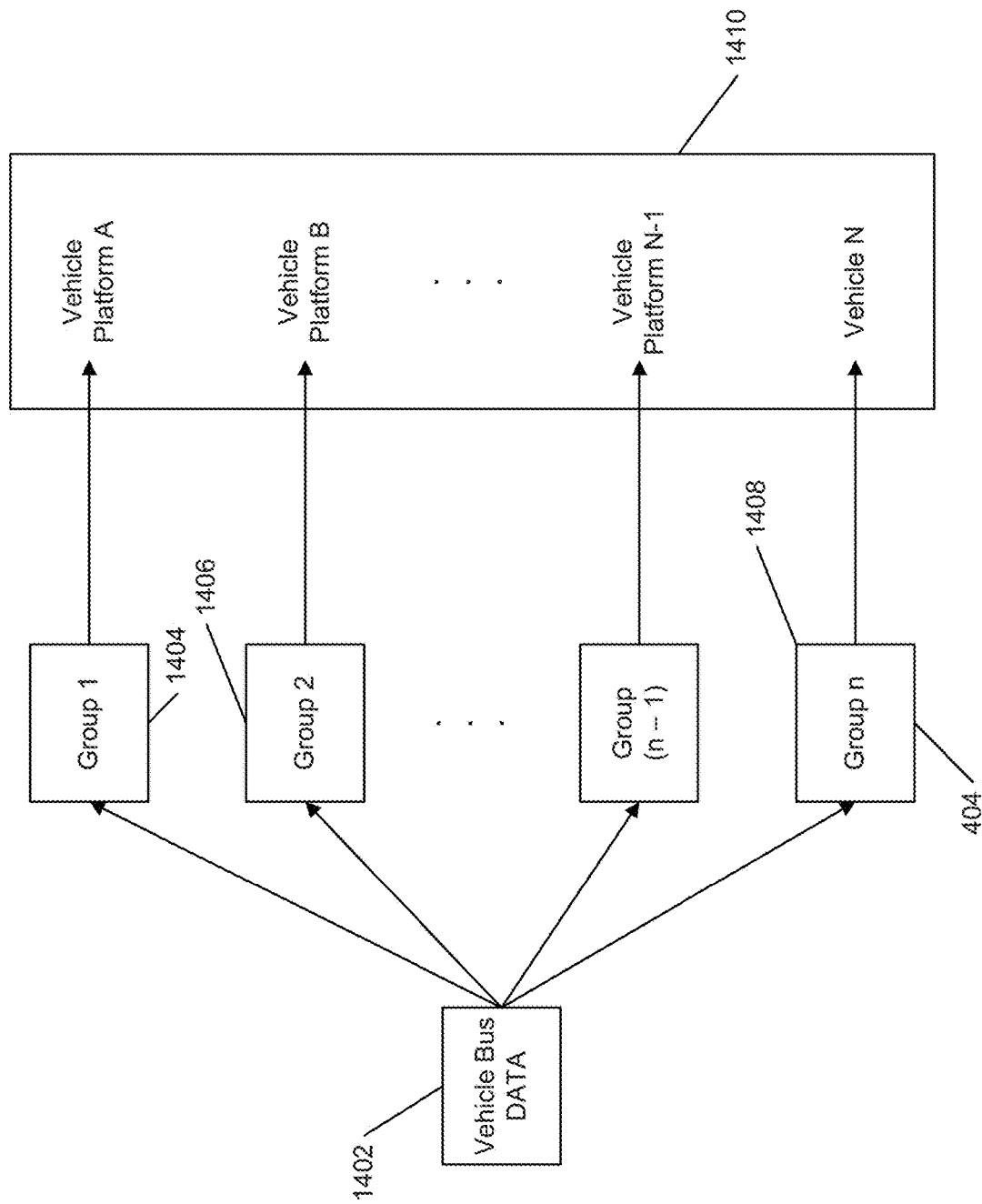
FIG. 14 illustrates a clustering machine learning model to cluster into different groups vehicle bus data in accordance with an embodiment of the invention.

FIG. 14 illustrates using a clustering machine learning model to cluster into different groups vehicle bus data. In particular, vehicle bus data 1402 is obtained and a clustering model is applied to classify the bus data into different groups, including Group 1 1404, Group 2 1406, Group N 1408. Accordingly, each group can then be associated with a vehicle platform 1410. The platform information can be associated with various different vehicle identification information, including YMM, trim, manufacturer, vehicle BUS protocol, geographic region of operation, among various other identification information). Based on the identified vehicle platform, many embodiments are able to identify a configuration profile or set of configuration settings (e.g., set of PIDs for enabling communicating with the set of vehicle modules on a vehicle) that can be used to enable communication on a particular vehicle platform. In many embodiments, different clustering techniques may be utilized, including K-means and K-Nearest Neighbor. An example of using K-Nearest Neighbor to cluster a set of vehicles in accordance with an embodiment of the invention is illustrated in FIG. 15.

Figure 15:
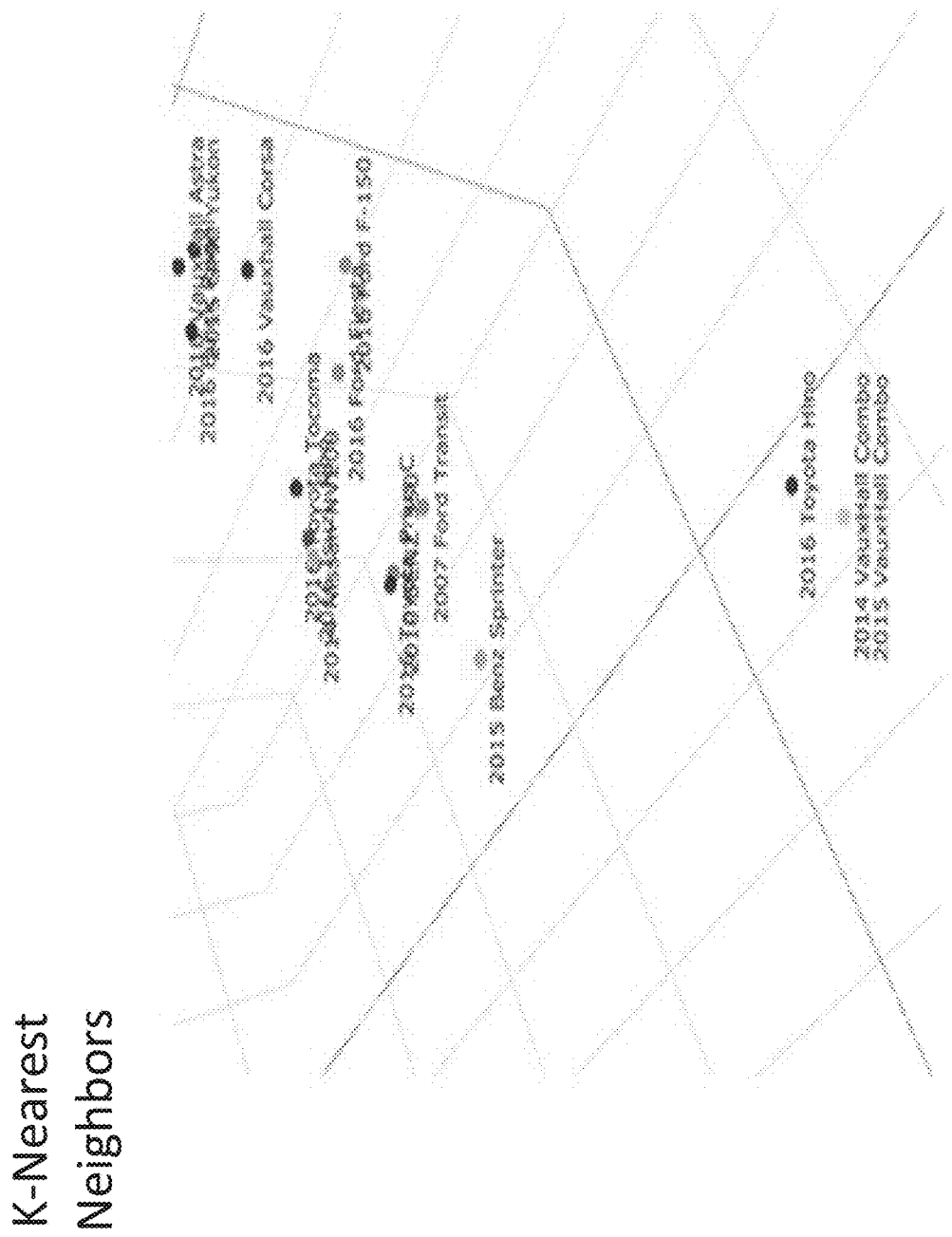
FIG. 15 illustrates an example of using a K-Nearest Neighbor to cluster a set of vehicles in accordance with an embodiment of the invention.

In particular, FIG. 15 illustrates using a K-Nearest Neighbor unsupervised learning classifier on a set of vehicles. In many embodiments, a K-Nearest Neighbor technique includes computing an L2-norm (Euclidean distance, Pythagorean theorem). As illustrated, a set of vehicles, including a 2015 Benz Sprinter, 2007 For Transit, 2016 Vauxhall Corsa among several other vehicles have been grouped into a first cluster and a 2016 Toyota Hino, a 2014 VauxHall Combo, and a 2015 VauxHall Combo have been grouped into a second cluster. Each cluster can be associated with a particular vehicle platform, accordingly a same set of vehicle device configuration settings for a 2016 Toyota Hino will likely be functional for a 2014 VauxHall Combo. Although FIG. 15 illustrates grouping a set of vehicles using a K-Nearest Neighbor model, any of a variety of machine learning models can be utilized to classify vehicle bus data to a set of vehicle profiles as appropriate to the requirements of specific applications in accordance with embodiments of the invention.

Additionally, machine learning classifiers can optionally use feature extraction to combine information in a way that still meaningfully represents the data. It should be readily apparent to one having ordinary skill in the art that many feature extraction techniques are available such as (but not limited to) principal component analysis, independent component analysis, isomap analysis, and/or partial least squares, and that feature extraction itself is optional.

Figure 16:
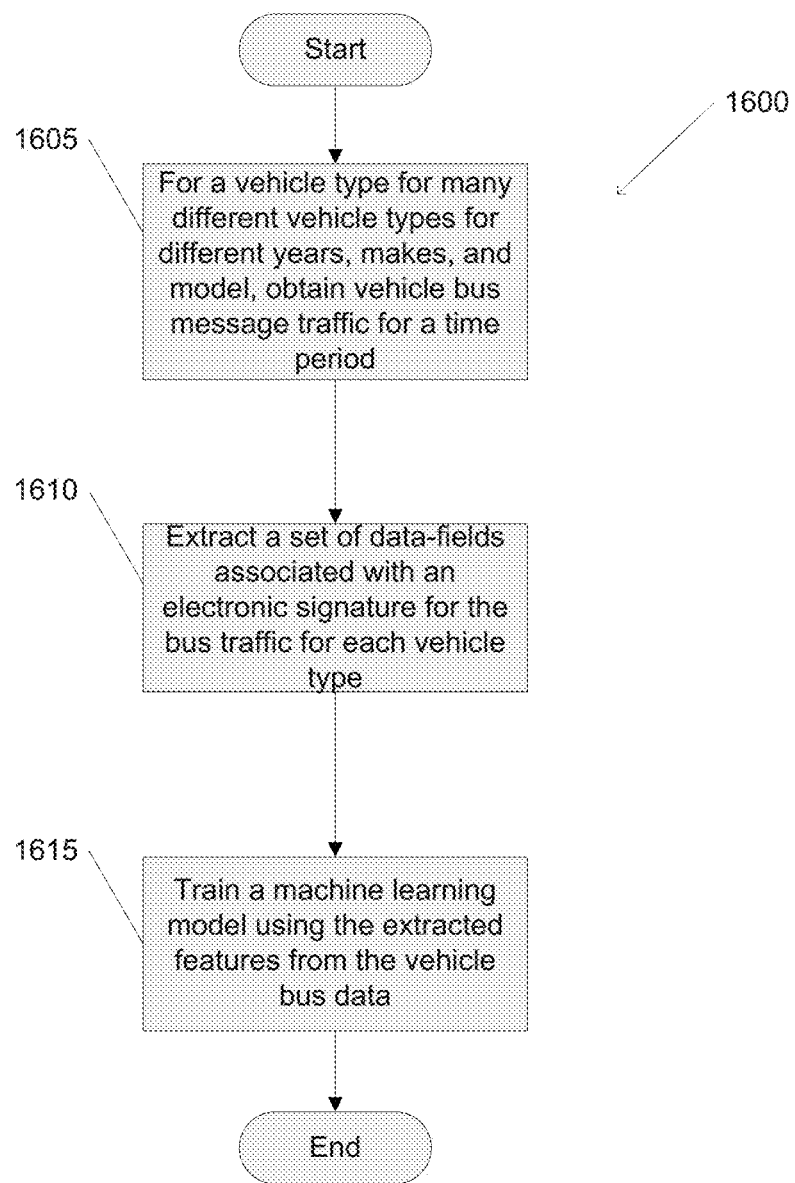
FIG. 16 illustrates a process for training a machine learning model on vehicle bus data to identify and classifying vehicles in accordance with an embodiment of the invention.

In many embodiments, a telematics device can be configured for a particular vehicle using identification information obtained using machine learning on the vehicle bus data, including a statistical analysis of the vehicle bus data. In particular, a machine learning model can be trained using a large collection of bus data from different vehicles, and new vehicles can be identified by running the model on a small collection of bus data obtained from the vehicle. A process for training a machine learning model on vehicle bus data to identify and classify vehicles in accordance with an embodiment of the invention is illustrated in FIG. 16. The process, for a vehicle type from many different vehicle types with different years, makes and models, listens (1605) to bus traffic of the vehicle for a time period. In many embodiments, the vehicles can be from different manufacturers, or the same manufacturer with different years, makes, models, trim levels, features, among many other configurations for different vehicles. The process can listen and collect bus data for a set time period, such as 10 seconds, or for different time periods that can be dynamically determined during operation of the vehicle. Different embodiments may collect bus information at different times during operation of the vehicle. For example, many embodiments may wait for a few minutes after a vehicle start up to begin collecting bus data from the vehicle in order to provide time for the various vehicle devices to initialize and begin executing. Different time periods can be utilized for different vehicles.

The process may determine (1610) an electronic signature for the bus traffic for each type of vehicle, including for example determining patterns, content, and/or statistics of the bus data. In many embodiments, the process can include determining a frequency for a vehicle module ID appearing in the bus data within a time period. In particular, many embodiments may determine the frequency by which different vehicle module IDs appear within a snap shot of the bus traffic. The process trains (1615) a machine learning model using the collected bus data for the different vehicles. In certain embodiments, other patterns, statistics, or features of the CAN bus traffic can be analyzed to ascertain an electronic signature, including messages/second, median message interval, median data length, auto-correlated period, median message length, among many other features as appropriate to the requirements of specific applications in accordance with embodiments of the invention. The process ends. Specific processes for training a machine learning model to identify vehicle platforms using vehicle bus data for different vehicles in accordance with embodiments of the invention are described above and shown with respect to FIG. 16; however, any number of processes and protocols can be utilized as appropriate to the requirements of a specific applications in accordance with embodiments of the invention.

Figure 17:
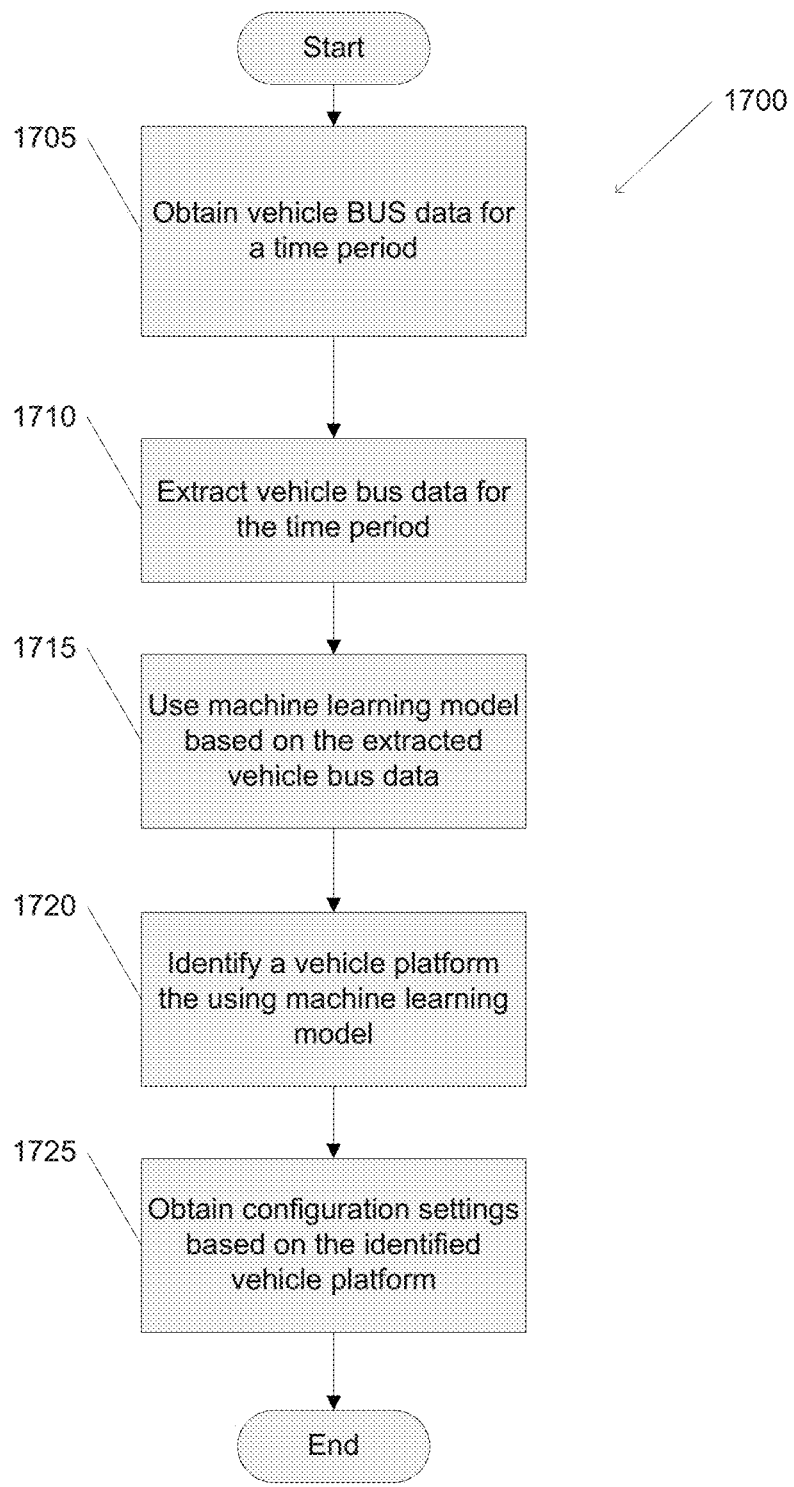
FIG. 17 illustrates a process for identifying a vehicle platform and configuring a telematics device accordingly in accordance with an embodiment of the invention.

Telematics devices in accordance with many embodiments of the invention can be installed in different types of vehicles that utilize different communication protocols and that include different sets of vehicle modules, and the telematics devices can be configured based on the particular set of vehicle properties that exist in the vehicle in which they are installed. Many embodiments can use one or more machine learning models to assist in the identification of a vehicle platform and the configuration of the telematics device for the identified platform. A process for identifying a vehicle platform and configuring a telematics device accordingly in accordance with an embodiment of the invention is illustrated in FIG. 17. The process obtains (1705) vehicle bus data. In many embodiments, the process may listen to vehicle CAN bus traffic for a time period (e.g., a few seconds). The process extracts vehicle bus data for the time period. In certain embodiments, the process may extract certain data-fields from the vehicle bus data, including the vehicle module ID. In many embodiments, the process may compute statistics for different data-fields in the vehicle bus traffic, including a frequency of a vehicle module ID (e.g., via the CAN Message ID data-field) frequencies, for the time period. The process uses (1715) a machine learning model using the extracted features. In many embodiments, the machine learning model can be a neural network that has been trained using a large collection of previously obtained and labeled vehicle bus data from a large variety of different vehicles. The process identifies (1720) a vehicle platform based on the machine learning model. In many embodiments, the process may identify a year, make, and/or model of the vehicle using the machine learning model. In many embodiments, a vehicle platform can be defined that provides information for communicating with a set of vehicle devices that may exist on a particular vehicle of a particular type. The process obtains (1725) a set of vehicle configuration settings based on the identified vehicle platform. In many embodiments, the process may identify a set of PIDs for the vehicle devices. The process ends. Specific processes for identifying a vehicle platform using a machine learning model in accordance with embodiments of the invention are described above and shown with respect to FIG. 17; however, any number of processes and protocols can be utilized as appropriate to the requirements of a specific applications in accordance with embodiments of the invention.

Although the embodiments have been described in certain specific aspects, many additional modifications and variations would be apparent to those skilled in the art. In particular, any of the various processes described herein can be performed in alternative sequences and/or in parallel (on the same or on different computing devices) in order to achieve similar results in a manner that is more appropriate to the requirements of a specific application. It is therefore to be understood that the embodiments that are disclosed can be practiced otherwise than specifically described without departing from the scope and spirit of this disclosure. Thus, the embodiments should be considered in all respects as illustrative and not restrictive. It will be evident to the person skilled in the art to freely combine several or all of the embodiments discussed here as deemed suitable for a specific application. Throughout this disclosure, terms like "advantageous", "exemplary" or "preferred" indicate elements or dimensions that are particularly suitable (but not essential) to one or more embodiments, and may be modified wherever deemed suitable by the skilled person, except where expressly required. Accordingly, the scope of the embodiments should be determined not by those illustrated and described, but by the appended claims and their equivalents.

What is claimed is:

1. A method for configuring a telematics device for a vehicle, comprising:
   receiving, at a remote server system and from the telematics device, first identification information provided from a first vehicle module of a plurality of different vehicle modules on a vehicle bus of the vehicle;
   receiving, at the remote server system and from the telematics device, second identification information provided from a second vehicle module of a plurality of different vehicle modules on a vehicle bus of the vehicle, wherein the first identification information and the second identification information are different types of identification information and wherein the first vehicle module and the second vehicle module are different types of vehicle modules;
   identifying, at the remote server system, a vehicle platform based on the first and second identification information by matching the first and second identification information with information stored in at least one database that has been reverse engineered for another vehicle with a same platform;
   identifying, at the remote server system, a set of communication data associated with the vehicle platform for communicating with the plurality of different vehicle modules;
   providing, at the remote server system, the set of communication data to the telematics device on the vehicle.

2. The method of claim 1, wherein identifying the vehicle platform based on the first and second identification information comprises matching the first and second identifying information to vehicle platform information stored in at least one database.

3. The method of claim 1, wherein the first or second identification information is at least one of a vehicle device identifier, manufacturer identifier, software identifier, and hardware identifier.

4. The method of claim 1, wherein the vehicle bus is a Controller Area Network (CAN) vehicle bus and the communication data is a set of On-board Diagnostic II Parameter IDs (OBD-II PIDs).

5. The method of claim 1, wherein the method further comprises:
communicating with the first vehicle module of the plurality of different vehicle modules using a first set of OBD-II PIDs received from the remote server system; and
communicating with the second vehicle module of the plurality of different vehicle modules using a second different set of OBD-II PIDs received from the remote server system.

6. The method of claim 1, further comprising:
providing, at the remote server system, information regarding a year, make, and model (YMM) of the vehicle from the remote server system; and
configuring the telematics device based on the YMM information.

7. The method of claim 1, wherein the at least one database includes identification information for identifying different vehicle modules for different types of vehicles.

8. The method of claim 1, wherein the at least one database includes different sets of configuration data for configuring different vehicle modules on different types of vehicles.

9. The method of claim 1, wherein the at least one database includes normalized sets of identification data for different manufacturers of vehicle modules.

10. A vehicle telematics device in a vehicle, comprising:
a processor and a memory storing a vehicle telematics application; and
a communication interface for communicating with a remote server system and a plurality of different vehicle modules on a vehicle bus of the vehicle;
wherein the processor of the telematics device, on reading the vehicle telematics application, is directed to:
send a first request according to a first vehicle bus protocol for identification information on the vehicle bus;
determine whether identification information has been received from at least one vehicle module of the plurality of different vehicle modules in response to the first request and within a reference time period;
send, in response to a determination that no identification information has been received within the reference time period, a second request according to a second vehicle protocol, different form the first vehicle protocol, for identification information on the vehicle bus;
receive, in response to the first or the second request, identification information from at least one vehicle module of the plurality of vehicle modules;
provide the identification information to the remote server system;
obtain communication data to allow for communication with the plurality of different vehicle modules from the remote server system; and
communicate with the at least one vehicle module using the communication data.

11. The vehicle telematics device of claim 10, wherein the remote server system identifies a vehicle platform based on the identification information by matching the identifying information to vehicle platform information stored in at least one database on the remote server system.

12. The vehicle telematics device of claim 10, wherein the identification information from the at least one vehicle module is at least one of a vehicle device identifier, manufacturer identifier, software identifier, and hardware identifier.

13. The vehicle telematics device of claim 10, wherein the vehicle bus is a Controller Area Network (CAN) vehicle bus and the communication data is a set of On-board Diagnostic II Parameter IDs (OBD-II PIDs).

14. The vehicle telematics device of claim 13, wherein the at least one vehicle module comprises a plurality of vehicle modules, wherein the processor of the telematics device, on reading the vehicle telematics application, is further directed to:
communicate with a first vehicle module of the plurality of vehicle different modules using a first set of OBD-II PIDs received from the remote server system; and
communicate with a second vehicle module of the plurality of vehicle different modules using a second set of OBD-II PIDs received from the remote server system.

15. The vehicle telematics device of claim 10, wherein the processor of the telematics device, on reading the vehicle telematics application, is further directed to:
obtain information regarding a year, make, and model, of the vehicle from the remote server system.

16. The vehicle telematics device of claim 10, wherein the remote server system includes at least one database that includes identification information for identifying different vehicle modules for different types of vehicles.

17. The vehicle telematics device of claim 10, wherein the remote server system includes at least one database that includes different sets of configuration data for configuring different vehicle modules on different types of vehicles.

18. The vehicle telematics device of claim 10, wherein the remote server system includes at least one database that includes normalized sets of identification data for different manufacturers of vehicle modules.

* * * * *